United States Patent
Takeda et al.

(10) Patent No.: US 6,648,945 B1
(45) Date of Patent: Nov. 18, 2003

(54) HOLLOW YARN MEMBRANE MODULE, POTTING AGENT THEREFOR AND METHOD FOR DEAERATION OF LIQUID CHEMICALS

(75) Inventors: Satoshi Takeda, Nagoya (JP); Osami Kato, Nagoya (JP); Kenji Watari, Nagoya (JP); Kenji Niikawa, Nagoya (JP); Masamoto Uenishi, Otake (JP); Hiroshi Tasaka, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/958,020

(22) PCT Filed: Apr. 3, 2000

(86) PCT No.: PCT/JP00/02151
§ 371 (c)(1),
(2), (4) Date: Oct. 2, 2001

(87) PCT Pub. No.: WO00/59614
PCT Pub. Date: Oct. 12, 2000

(30) Foreign Application Priority Data

Apr. 2, 1999 (JP) .......................................... 11/097064
May 13, 1999 (JP) .......................................... 11/132580

(51) Int. Cl.$^7$ ........................ B01D 53/22; B01D 19/00; B01D 63/02
(52) U.S. Cl. ........................ 95/46; 96/6; 96/8; 96/10; 96/14
(58) Field of Search ........................ 95/46; 96/6, 8, 96/10, 13, 14

(56) References Cited

U.S. PATENT DOCUMENTS

| | | | | |
|---|---|---|---|---|
| 4,323,453 A | * | 4/1982 | Zampini | 96/6 X |
| 4,323,454 A | * | 4/1982 | Fritzsche et al. | 96/6 X |
| 4,842,910 A | | 6/1989 | Caskey | |
| 4,923,679 A | * | 5/1990 | Fukasawa et al. | 95/46 X |
| 4,948,560 A | * | 8/1990 | Deguchi et al. | 95/46 X |
| 5,059,374 A | * | 10/1991 | Krueger et al. | 96/8 X |
| 5,211,728 A | * | 5/1993 | Trimmer | 95/46 X |
| 5,221,388 A | * | 6/1993 | Haubs et al. | 96/8 X |
| 6,033,475 A | * | 3/2000 | Hasebe et al. | 96/8 X |
| 6,217,634 B1 | * | 4/2001 | Dominelli et al. | 96/6 X |
| 6,290,756 B1 | * | 9/2001 | Macheras et al. | 96/8 |

FOREIGN PATENT DOCUMENTS

| | | |
|---|---|---|
| JP | 1-156738 | 6/1989 |
| JP | 1-293105 | 11/1989 |
| JP | 2-293025 | 4/1990 |
| JP | 2-293024 | 12/1990 |
| JP | 5-17712 | 1/1993 |
| JP | 6-170176 | 6/1994 |
| JP | 6-170177 | 6/1994 |
| JP | 6-319960 | 11/1994 |
| JP | 7-34850 | 4/1995 |
| JP | 7-34851 | 4/1995 |
| JP | 8-243306 | 9/1996 |
| JP | 9-7936 | 1/1997 |
| JP | 9-187629 | 7/1997 |
| JP | 9-262406 | 10/1997 |
| WO | WO 98/48926 | 11/1998 |
| WO | WO 99/17866 | 4/1999 |
| WO | WO00/59614 | 10/2000 |

* cited by examiner

Primary Examiner—Robert H. Spitzer
(74) Attorney, Agent, or Firm—Fitch, Even, Tabin & Flannery

(57) ABSTRACT

A hollow fiber membrane module and potting material can be used for chemical deaeration in a semiconductor production process, in printers, in a liquid crystal sealing process or in a chemical production process. A hollow fiber membrane module 1 includes, as potting material 2, an epoxy resin cured product in which the weight change per unit surface area of a potting material test piece after immersing the test piece in a chemical for 6 months at room temperature is within the range of −20 to +20 mg/cm$^2$, and as housing 4, a polyolefin in which the weight change per unit surface area of a test piece after immersing the test piece in a chemical for 6 months at room temperature is within the range of −20 to +20 mg/cm$^2$, and the total metal content is 300 ppm or less. The module has a long service life when used for chemical treatment without leakage.

24 Claims, 3 Drawing Sheets

HOLLOW YARN MEMBRANE MODULE, POTTING AGENT THEREFOR AND METHOD FOR DEAERATION OF LIQUID CHEMICALS

This application is the National phase of International Application PCT/JP00/02151, filed Apr. 3, 2000, which designated the U.S. and that International Application was not published under PCT Article 21(2) in English.

TECHNICAL FIELD

The present invention relates to a hollow fiber membrane module having superior chemical resistance used for deaeration treatment of chemicals in a semiconductor production process, printers, liquid crystal sealing process or chemical production process and so forth, its potting material and a chemical deaeration method using said hollow fiber membrane module.

This application is based on Japanese Patent Application No. Hei 11-97064 and Japanese Patent Application No. Hei 11-132580), the contents of which are incorporated herein by reference.

BACKGROUND ART

In a semiconductor production process, a photoresist liquid is coated onto a thin film laminated onto a semiconductor wafer, and after exposing and developing through a mask in which a pattern is formed, is etched to form a pattern in the thin film.

At this time, in the developing step, a developing solution (chemical) is typically pumped to a discharge nozzle with nitrogen gas and discharged from that nozzle to spin coat developing solution onto the semiconductor wafer. However, the pressure applied to the chemical when discharged from the nozzle may return to atmospheric pressure resulting in the supersaturated dissolved gas forming bubbles. If the developing solution is spin coated onto the semiconductor wafer while still containing bubbles, development is incomplete resulting in the occurrence of undeveloped portions. Thus, it is necessary to deaerate the nitrogen gas that is dissolved in the chemical pumping step to inhibit the formation of bubbles.

Moreover, in a semiconductor production process, in a step in which an interlayer insulating film is coated followed by cutting away the non-flat portion around the film (edge rinsing step), work is performed in which a solvent (consisting primarily of alcohol) is dropped onto the film to dissolve the peripheral edge of the film. In addition, in an edge rinsing step performed in the same manner as in the case of the above interlayer insulating film after having coated a thin film having a low dielectric constant, work is performed in which a solvent (such as alcohol, ether, ketone or hydrocarbon) is dropped onto the film to dissolve the peripheral edge of the film. In these steps, the solvent that is used is also pumped with nitrogen gas. Consequently, bubbles may form when the pressure is released thereby resulting in the formation of bubbles along with the splashing of liquid droplets onto the film causing the occurrence of defects. Thus, in order to eliminate these defects, it is necessary to deaerate the gas dissolved in the solvent to inhibit the formation of bubbles.

Moreover, in addition to the developing solution and solvent mentioned above, it is also necessary to deaerate a photoresist solution as necessary.

In addition, deaeration is also performed for printer ink as well. In an ink jet printer equipped with a piezo element head, pressurization and depressurization are repeated several times by the piezo element during ink discharge. At this time, dissolved nitrogen, oxygen and other gases in the ink filled in the head grow into bubbles and these bubbles easily accumulate in the head. Consequently, these bubbles are discharged during ink discharge causing the occurrence of printing omissions.

In addition, in an ink jet printer equipped with a thermal head, gas dissolved in the ink grows into bubbles during head driving in the thermal cycle of rapid heating and cooling of the ink, and these bubbles easily accumulate in the head. Consequently, these bubbles are discharged during ink discharge causing the occurrence of printing omissions.

Thus, it is necessary to reduce the concentration of dissolved gas in the ink and inhibit the formation of bubbles by deaerating in these printers as well.

As an example of a technology relating to deaeration of dissolved gas in a chemical using a membrane, a deaerating membrane module for semiconductor developing solution is proposed in Japanese Unexamined Patent Application, First Publication No. Hei 9-187629. The deaerating membrane module disclosed here is that in which those portions of the housing and/or end caps, hollow fiber membrane and end seals that come in contact with chemical are composed of a material having superior developing solution resistance.

With respect to this deaerating membrane module, epoxy resin is used as a preferable example of the material of its sealing material (potting material). Examples of epoxy resins include glycidyl ether, glycidyl ester, glycidyl amine, aliphatic epoxide and alicyclic epoxide, while examples of curing agents include aliphatic polyamines, alicyclic polyamines, polyamide amines and polyamides.

In addition, a preferable example of a hollow fiber membrane is a heterogeneous hollow fiber membrane composed of poly-4-methylpentene-1, and having a pore-free, homogeneous thin film layer that is continuous with the surface of a porous membrane.

In addition, a method in which dissolved nitrogen in a chemical is deaerated using a non-porous (homogeneous) tube membrane, in which poly(tetrafluoroethylene) resin having superior solvent resistance is formed into the shape of a tube, is proposed in Japanese Unexamined Patent Application, First Publication No. Hei 8-243306 and Japanese Unexamined Patent Application, First Publication No. Hei 9-7936.

In addition, as an example of printer ink deaeration technology, an ink deaeration method for ink jet recording is proposed in Japanese Unexamined Patent Application, First Publication No. Hei 5-17712. This is a method for deaerating ink using a gas permeable membrane having a thickness of 10 $\mu$m or less composed of polyethylene resin, polypropylene resin, poly(tetrafluoroethylene) resin, polystyrene resin, polymethyl methacrylate resin and so forth.

However, in the deaerating membrane module described in the above Japanese Unexamined Patent Application, First Publication No. Hei 9-187629, the chemical resistance of each member used in the deaerating module was evaluated according to the amount of change induced by chemical immersion for 3 months. Consequently, this method for evaluating chemical resistance was unable to accommodate members in which deterioration progresses rapidly after 3 months of immersion. Deaerating membrane modules using such members had problems with long-term stability. In addition, although each of the members of this deaerating membrane module exhibit a certain degree of resistance to alkaline chemicals like semiconductor developing solution, they were not resistant to chemicals such as alcohols, photoresist, printer ink and liquid crystal, and had problems such as swelling and elution caused by these chemicals. Consequently, this deaerating membrane module was unable to be used for deaerating chemicals such as alcohols, photoresist, printer ink and liquid crystal, etc.

In order to solve this problem, a membrane module was proposed in which the entire module is composed of thermoplastic resin having high resistance to solvents and other chemicals as proposed in Japanese Examined Patent Application, Second Publication No. Hei 7-34850, Japanese Examined Patent Application, Second Publication No. Hei 7-34851 and Japanese Unexamined Patent Application, First Publication No. Hei 1-293105. In the production of these modules, in order to separate the one side and the other of the membrane in a fluid-tight or airtight manner, a thermoplastic resin is used for the potting material when fixing the membrane to the housing, and particularly when fixing the hollow fiber membrane to the housing with the potting material. Consequently, it is essential to melt the potting material for potting processing.

However, in the case of performing potting processing by melting the potting material, it is necessary to select a hollow fiber membrane that it is able to withstand the heat during processing, thereby resulting in the problem of the hollow fiber membrane that can be used being extremely limited. In addition, the viscosity of the melted potting material is normally extremely high. Consequently, in the case of fixing hollow fiber bundles consisting of collected hollow fibers to the housing with a potting material, it becomes difficult for the resin to penetrate between the fibers resulting in the problem of the formation of "loose areas" in potted portions. These "loose areas" in the potted portions easily cause leaks.

Moreover, fluororesins are used as ideal thermoplastic resins. However, polymers of fluororesins such as PTFE are expensive, and also have the disadvantage of having comparatively low processability.

On the other hand, a module having superior solvent resistance that uses a thermosetting resin for the potting material is proposed in Japanese Unexamined Patent Application, First Publication No. Hei 6-170176. This thermosetting resin is a combination of epoxy resin and cationic polymerization curing agent or anionic polymerization curing agent. However, depending on the type of curing agent, there is concern over the risk of metal in the curing agent eluting into the chemical and causing contamination of the chemical.

Moreover, the addition of inorganic filler to the potting material is also proposed in Japanese Unexamined Patent Application, First Publication No. Hei 6-170176. However, this method also had the problem of the chemical being contaminated by metal that elutes from the filler. Moreover, even if a polyurethane resin is used for the potting material, there was also concern over elution of metal in the case of using a polyurethane resin that is cured by adding an organometallic catalyst to accelerate the curing reaction.

In addition, polyolefin having resistance to chemicals is typically used for the housing material. However, since polyolefin contains significant amounts of metals or other compounds as impurities, there was the problem of the metal in the housing eluting into the chemical when the chemical and housing came in contact. Elution of metal into the chemical has the potential to cause serious defects in the semiconductor production process. Accordingly, it is necessary to avoid contamination of the chemical by metal.

In addition, fluororesins such as PTFE are examples of materials frequently used as a chemical resistant material. However, fluororesins had the problem of being difficult to process as well as being extremely expensive.

In addition, the heterogeneous hollow fiber membrane comprised of Poly(4-methylpentene-1) mentioned above is also susceptible to the formation of communicated pores in the homogeneous thin film layer, and to the occurrence of pin holes in the homogeneous thin film layer caused by mechanical wear during handling following membrane production. Thus, in the case of such membrane, when a chemical penetrates into the porous pores by wetting the membrane material, there were cases in which the chemical leaked from the pores and pin holes in the homogeneous thin film layer.

In addition, in the case of a method using the non-porous (homogeneous) tube membrane comprised of poly (tetrafluoroethylene) resin previously described, in addition to the low nitrogen permeability coefficient of the membrane material, since the thickness of the tube is also thick, the nitrogen transmission rate is low (for example, nitrogen transmission rate $0.5 \times 10^{-11}$ $cm^3/cm^2 \cdot Pa \cdot sec$) such that even if deaeration was performed, there were cases in which it was inadequate as a practical level of deaeration.

In addition, a deaeration method for the ink jet recording ink previously described consists of supplying raw material ink to the hollow portions of a hollow fiber membrane, reducing the pressure outside the membrane, and deaerating dissolved gas in the ink through the membrane. However, since the thickness of the tetrafluoroethylene tube used in its embodiments is extremely thin at 1–2 $\mu$m resulting in low mechanical strength, there were cases in which the membrane ruptured due to the pressure of the raw material ink, thereby causing leakage of ink.

In order to solve the above problems, the object of the present invention is to provide a hollow fiber membrane module having superior chemical resistance by using a material having superior chemical resistance as the material of a housing that contains and protects a hollow fiber membrane and a potting material that adheres and fixes the hollow fiber membrane.

In addition, another object of the present invention is to provide a hollow fiber membrane module free of metal elution by using a material that is free of contamination by metal impurities for a potting material and housing material.

Moreover, another object of the present invention is to provide a hollow fiber membrane module having superior chemical resistance, deaeration performance and durability performance by using a hollow fiber membrane having superior chemical resistance and gas permeability, as well as a chemical deaeration method capable of efficiently deaerating chemicals.

DISCLOSURE OF INVENTION

The potting material for a hollow fiber membrane module of the present invention is characterized as being an epoxy resin cured product wherein, in a potting material for a hollow fiber membrane module that adheres and fixes a hollow fiber membrane wherein, the weight change per unit surface area of a potting material test piece after immersing said test piece in a chemical for 6 months at room temperature is within the range of −20 to +20 $mg/cm^2$. This potting material for a hollow fiber membrane module has superior chemical resistance.

In addition, the potting material for a hollow fiber membrane module of the present invention is preferably an epoxy resin cured product wherein the rate of change in the thickness of a potting material test piece after immersing said test piece in a chemical for 6 months at room temperature is within the range of −15 to +15%. This potting material for a hollow fiber membrane module has superior chemical resistance.

In addition, the potting material for a hollow fiber membrane module of the present invention is preferably the cured product of an epoxy resin having a polysulfide skeleton in its molecule and a curing agent at least containing an aromatic polyamine. This potting material for a hollow fiber membrane module has low compatibility with solvent and is resistant to swelling caused by chemicals.

In addition, the potting material for a hollow fiber membrane module of the present invention is preferably the cured product of an epoxy resin having at least three glycidyl groups in its molecule and a curing agent at least containing an aromatic polyamine. Since this potting material for a hollow fiber membrane module has high crosslinking density, it has even more superior chemical resistance.

In addition, the content of metal present in the potting material is preferably 300 ppm or less. This potting material for a hollow fiber membrane module does not cause contamination of the chemical by metal.

In addition, the hollow fiber membrane module of the present invention is characterized by a hollow fiber membrane being adhered and fixed by the above potting material for a hollow fiber membrane module. This hollow fiber membrane module can be used in chemical treatment for a long period of time without the occurrence of leakage from the module. In addition, this hollow fiber membrane module does not cause contamination of the chemical by metal.

In addition, the hollow fiber membrane module of the present invention is characterized by its housing material being a polyolefin in which the weight change per unit surface area of a polyolefin test piece after immersing said test piece in a chemical for 6 months at room temperature is within the range of −20 to +20 mg/cm$^2$, and the total content of metal present in the polyolefin is 300 ppm or less. Since the housing material of this hollow fiber membrane module has superior chemical resistance, it can be used in chemical treatment for a long period of time without the occurrence of leakage from the module In addition, the above polyolefin is preferably such that the rate of change in the thickness of a test piece thereof after immersing said test piece in a chemical for 6 months at room temperature is preferably within the range of −15 to +15%. Since this polyolefin has superior chemical resistance, it is suitable for a housing material.

In addition, the above polyolefin is preferably polyethylene or cycloolefin polymer. Since this polyolefin has superior chemical resistance and has a low metal content, it is suitable for a housing material.

In addition, the hollow fiber membrane module of the present invention is characterized by a hollow fiber membrane being adhered and fixed in a housing comprised of the above polyolefin by the above potting material for a hollow fiber membrane module. Since potting material and housing material of this hollow fiber membrane module have superior chemical resistance, it can be used in chemical treatment for a long period of time without the occurrence of leakage from the module.

In addition, the hollow fiber membrane module of the present invention is preferably such that the hollow fiber membrane is a hollow fiber membrane having a composite structure in which a homogeneous thin film is juxtapositioned between porous support layers, the transmission rate ratio of the oxygen transmission rate to the nitrogen transmission rate of the hollow fiber membrane is 1.1 or more, and the rate of change in the above transmission rate ratio of after immersing in a chemical for 6 months at room temperature is within the range of −15 to +30%. This hollow fiber membrane module has superior chemical resistance, deaeration performance and durability performance.

In addition, the above hollow fiber membrane is preferably such that the weight change ratio of the hollow fiber membrane after immersing in a chemical for 6 months at room temperature is within the range of −30 to +30%. Since this hollow fiber membrane has superior chemical resistance, it can be suitably used in the hollow fiber membrane module of the present invention.

In addition, the above hollow fiber membrane is preferably such that the nitrogen transmission rate is 0.5–10$^{-9}$ cm$^3$/cm$^2$·Pa·sec or more, and the oxygen transmission rate is 0.6'10$^{-9}$ cm$^3$/cm$^2$·Pa·sec or more. Since this hollow fiber membrane has superior deaeration performance, it can be suitably used in the hollow fiber membrane module of the present invention.

In addition, the chemical deaeration method of the present invention is characterized by being a chemical deaeration method that removes dissolved gas in a chemical using a hollow fiber membrane module that uses the above hollow fiber membrane module. According to this chemical deaeration method, changes in chemical composition during deaeration treatment can be inhibited, and an uncontaminated, deaerated chemical can be obtained efficiently and with stability over a long period of time.

In addition, the chemical deaeration method of the present invention is characterized as being a chemical deaeration method that removes dissolved gas in a chemical using a hollow fiber membrane module wherein, the chemical contains a nonionic fluorosurfactant, and at least the portion of the hollow fiber membrane that contacts the chemical is made of polyolefin. According to this chemical deaeration method, changes in chemical composition during deaeration treatment can be inhibited, and an uncontaminated, deaerated chemical can be obtained efficiently and with stability over a long period of time.

In addition, in the chemical deaeration method of the present invention, the above polyolefin is preferably polyethylene, polypropylene or poly(4-methylpentene-1). Since these polyolefins exhibit little adsorption of nonionic fluorosurfactant, they can be used suitably in the chemical deaeration method of the present invention.

In addition, the chemical deaeration method of the present invention is suitable for the case of using photoresist or developing solution as the chemical.

BEST MODE FOR CARRYING OUT THE INVENTION

The following provides a detailed explanation of the present 3invention.

Figure 1:
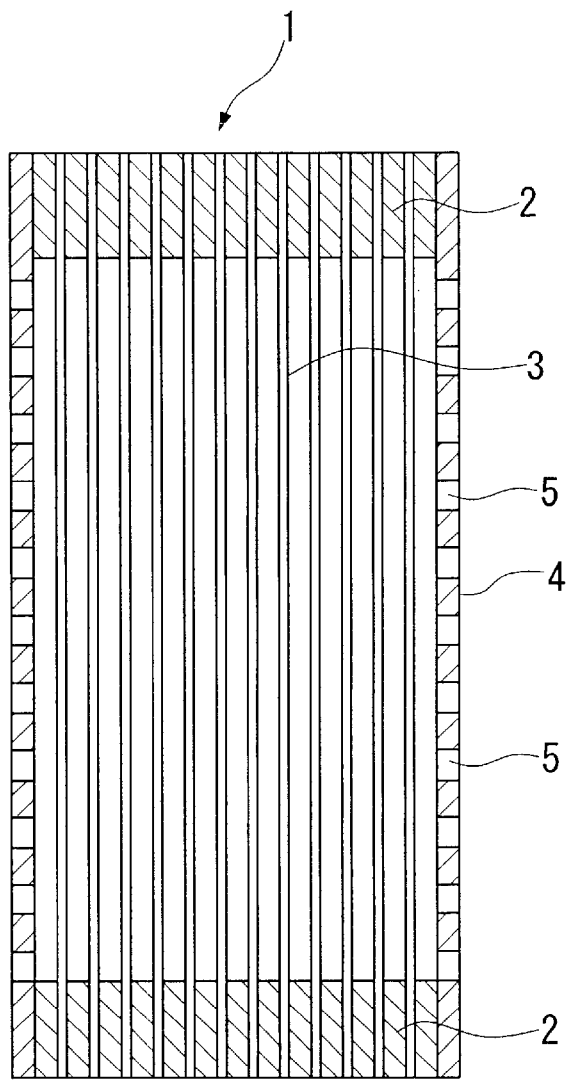
FIG. 1 is a cross-sectional view showing one example of the hollow fiber membrane module of the present invention.

The hollow fiber membrane module applied by the present invention is like that shown, for example, in FIG. 1. In the hollow fiber membrane module 1 shown in the figure, hollow fiber membrane 3 is contained within a cylindrical housing 4 having a large number of pores 5 in its wall surface. In this module, hollow fiber membrane 3 is fixed inside housing 4 by potting materials 2 in the state in which both of its ends are open.

The potting material of the present invention is such that the weight change per unit surface area of a potting material test piece after said test piece is immersed in a chemical for six months at room temperature is within the range of −20 to +20 mg/cm².

In addition, the potting material is preferably such that the rate of change in thickness of a potting material test piece after said test piece is immersed in a chemical for six months at room temperature is within the range of −15 to +15%.

Swelling, elution and so forth of the potting material caused by chemical is affected by the surface area of the potting material that is in contact with the chemical. In addition, significant changes also appear in the weight and dimensions of the potting material caused by the chemical. Therefore, in the present invention, weight change per unit surface area and rate of change of thickness are used as indicators of chemical resistance of the potting material.

The potting material test piece refers to that comprised of potting material for which the cured state has become stable and has the prescribed shape. A stable cured state is the state in which, for example, in the case of the potting material being composed of epoxy resin and curing agent, both have been mixed at room temperature followed by allowing to stand overnight and cured by heating for six hours at 80° C. The potting material test piece measures 60 mm long, 8 mm wide and 2 mm thick, and has a surface area of about 12.3 cm².

The chemical resistance test consists of immersing this potting material test piece in a chemical (having a liquid volume of 8 ml per 1 cm² of test piece surface area) for 6 months at room temperature, namely 23° C., performing sampling and measurement, and calculating according to the following equations 1 and 2. Furthermore, in the following embodiments, evaluation was performed on 10 samples followed by determination of their average value.

> Weight change per unit surface area (mg/cm²)={weight of potting material test piece after immersion (mg)−weight of potting material test piece before immersion (mg)}/surface area of potting material test piece before immersion (cm²)   Equation 1:
>
> Rate of change of thickness (%)=[{thickness of potting material test piece after immersion (mm)/−thickness of potting material test piece before immersion (mm)}/thickness of potting material test piece before immersion (mm)]×100   Equation 2:

In the case the weight change per unit surface area after immersing in chemical is greater than +20 mg/cm², the potting material swells due to penetration of chemical causing separation of the potting material and hollow fiber membrane, disintegration of the potting material, and destruction of the housing. On the other hand, in the case the weight change per unit surface area decreases by more than −20 mg/cm², elution of the potting material occurs, and not only is the potting material no longer able to separate the one side and the other of the hollow fiber membrane in a fluid-tight manner, but this also causes variations in the chemical composition.

In addition, in the case the rate of change in thickness after immersing in a chemical is greater than +15%, the potting material swells due to penetration of chemical, and in the case it decreases by more than −15%, elution of the potting material occurs.

By composing a hollow fiber membrane module using a potting material for which the weight change per unit surface area after immersing in a chemical is within the range of −20 to +20 mg/cm², and the rate of change in thickness is within the range of −15 to +15%, a hollow fiber membrane module can be obtained that has superior chemical resistance and is free of problems found in the prior art such as disintegration of the potting material.

Chemicals used in the chemical resistance test in the present invention are target solutions for which resistance is required depending on the application of the hollow fiber membrane module, examples of which include organic solvents such as methanol, ethanol, isopropyl alcohol, butanol, methyl ethyl ketone, ethyl cellosolve, ethyl lactate, propylene glycol monomethyl ether and propylene glycol monomethyl ether acetate, photoresist, semiconductor developing solution, printer ink and liquid crystal. More specifically, isopropyl alcohol, semiconductor developing solution {water/tetramethyl ammonium hydroxide 98/2 (wt %)}, spin-on-glass solution {isopropyl alcohol/tetraethoxysilane/water=70/2/28 (wt %)}, printer ink {water/ethylene glycol/isopropyl alcohol=80/5/15 (wt %)}, liquid crystal {cholesteryl chloride, cholesteryl nonanoate}, photoresist thinner {propylene glycol monomethyl ether/propylene glycol monomethyl ether acetate=70/30 (wt %)} and so forth are applied.

Examples of potting materials having such characteristics include (1) cured products of epoxy resin having a polysulfide skeleton in their molecules, and (2) cured products of epoxy resin having at least 3 glycidyl groups in their molecules.

To begin with, the following provides an explanation of (1) epoxy resin having a polysulfide skeleton in its molecule. Although there are no particular restrictions on the structure of the epoxy resin having a polysulfide skeleton in its molecule referred to here, an example of such is the polysulfide modified epoxy resin represented with the chemical formula shown below.

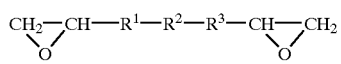

In the chemical formula, $R^1$ and $R^3$ represent organic acids containing a bisphenol skeleton, and R represents a polysulfide skeleton represented with —$(C_2H_4OCH_2OCH_2H_4—S_m)_n$— (wherein, m has a value of 1 to 3 and indicates the mean content of S in the polysulfide skeleton, and n has a value of 1 to 50 and indicates the mean content of polysulfide skeleton in a single molecule).

The polysulfide modified epoxy resin having a polysulfide skeleton in its molecule has low compatibility with chemicals, and its cured product is resistant to swelling and so forth caused by chemicals and has superior chemical resistance.

Examples of the above organic acids containing a bisphenol skeleton include bisphenol A epoxy resin, halogenated bisphenol A epoxy resin, bisphenol F epoxy resin, halogenated bisphenol F epoxy resin as well as those containing similar or analogous chemical structures. Furthermore, in the present invention, polysulfide modified epoxy resin can be used by mixing with bisphenol epoxy resin, halogenated bisphenol epoxy resin or urethane modified epoxy resin and so forth as necessary.

Next, the following provides an explanation of (2) epoxy resin having at least 3 glycidyl groups in its molecule. The use of epoxy resin having at least 3 glycidyl groups in its molecule increases the crosslinking density of the cured product and makes it possible to more effectively inhibit the mobility of network chains. Increasing the crosslinking density inhibits swelling caused by penetration of chemical into the cured product, and allows the obtaining of a potting material having superior chemical resistance. Furthermore, this epoxy resin having at least 3 glycidyl groups in its molecule should be an epoxy resin in which the main component has at least 3 glycidyl groups even in the case of partially containing a component having less than 3 glycidyl groups due to effects of molecular weight distribution.

There are no particular restrictions on the structure of the epoxy resin having at least 3 glycidyl groups in its molecule, and examples include sorbitol polyglycidyl ether, tetraphenyl glycidyl ether ethane, triphenyl glycidyl ether methane, triglycidyl paraaminophenol, triglycidyl isocyanurate, tetraglycidyl diaminodiphenyl methane, tetraglycidyl metaxylene diamine, phenol novolak epoxy resins, orthocresol novolak epoxy resins, DPP novolak epoxy resins and tetraphenylol ethane epoxy resins. Furthermore, in the present invention, the above epoxy resins can be used by mixing with bisphenol epoxy resin, halogenated bisphenol epoxy resin and urethane modified epoxy resin and so forth as necessary.

Examples of epoxy resin curing agents that are commonly used include aliphatic polyamines, alicyclic polyamines, aromatic polyamines, polyamide polyamines, polyamides, dicyandiamides, acid anhydrides, tertiary amines, imidazole compounds and $BF_3$ complexes. In particular, the use of a curing agent containing an aromatic polyamine allows the obtaining of a potting material having particular superior chemical resistance.

Since aromatic polyamine curing agents have an aromatic ring in their molecular chain, they have a rigid structure with a low degree of freedom of their conformation due to reacting with epoxy resin. Since swelling of the potting material caused by a chemical occurs due to penetration of chemical into the reaction product, a potting material having a rigid structure with a low degree of freedom is resistant to chemical penetration and has superior chemical resistance.

In addition, aromatic polyamines have weaker basicity than, for example, aliphatic polyamines, and are susceptible to the steric hindrance effects of aromatic rings. Consequently, they also have the characteristic of facilitating control of the curing rate without being accompanied by sudden curing of the potting material, generation of heat and so forth. In addition, aromatic polyamine curing agents can be used mixed with other curing agents as necessary.

Although the amount of curing agent added is normally equal to the stoichiometric amount of epoxy resin or slightly in excess of that amount, it is slightly lower in the case of using an accelerator (such as alcohol or phenol).

The reaction between epoxy resin and polyamine curing agent is composed of a chain growth stage and a crosslinking stage. The chain growth stage is composed of a straight chain growth stage by addition of amino groups to epoxy groups, and a branched growth stage (gel formation) in which the secondary amino groups and hydroxyl groups formed are competitively added to new epoxy groups. In the crosslinking stage, a crosslinked structure is formed of branched oligomers.

Swelling of the potting material caused by chemical occurs due to penetration of chemical into the potting material. Therefore, potting materials having a higher crosslinking density are preferable as potting materials that are not swelled by chemical and exhibit superior chemical resistance. In order to increase the crosslinking density, it is preferable to heat and cure the reaction product of epoxy resin and curing agent. Although the curing temperature and time are suitably selected according to the shape, size, processability and so forth of the reaction product, they are preferably 30 minutes or more at 70° C. and above, and more preferably 30 minutes or more at 80° C. and above.

Aromatic polyamine curing agents yield potting materials having superior chemical resistance as mentioned above. Catalytic curing agents are an example of a curing agent that yields a similar level of chemical resistance other than aromatic polyamine curing agents. Examples of catalytic curing agents include anionic polymerization types (such as tertiary amines and imidazole compounds) and cationic polymerization types (such as $BF_3$ complexes). These catalytic curing agents cause addition polymerization of glycidyl groups. In addition polymerization, the characteristics of the curing agent are basically not incorporated in the three-dimensional network structure of the cured product, while the characteristics of the epoxy resin are reflected more in the characteristics of the cured product.

Potting materials obtained by the above reaction of epoxy resin and curing agent exhibit superior stability relative to the above-mentioned chemicals such as organic solvents, photoresist, semiconductor developing solution, printer ink and liquid crystal.

In the case of using a hollow fiber membrane module for deaeration treatment of a chemical, elution of metals and metal compounds (to be referred to as metals) contained as impurities in the potting material into the chemical is a major problem. In order to inhibit this elution of metal into the chemical, it is preferable to use a potting material that has a low content of metal present therein. The total content of metal present in the potting material is preferably 300 ppm or less. If the metal content exceeds 300 ppm, metal or metal compounds elute into the chemical resulting in the possibility of contaminating the chemical. The metal content is therefore preferably 100 ppm or less, and more preferably 50 ppm or less.

The metal content in the present invention refers to the amount of metal contained as metal elements. Examples of target metal elements include the alkaline metals of Na and K, the alkaline earth metals of Mg and Ca, the transition metals of Ti, Cr, Mn, Fe, Ni, Cu and Zn, and each of the metal elements of Al, Sn and Pb. Thus, the metal content refers to the sum of the contents of each metal element as determined from analysis values of those respective metal elements. In addition, there are no particular restrictions on the methods for analyzing each metal element.

Next, an explanation is provided of the housing used in the present invention.

An example of the housing in the present invention is preferably that in which the weight change per unit surface area of a housing test piece after said test piece is immersed in a chemical for 6 months at room temperature is within the range of −20 to +20 $mg/cm^2$. In addition, it is also preferably preferable that in which the rate of change in thickness of a housing test piece after said test piece is immersed in a chemical for 6 months at room temperature is within the range of −15 to +15%.

Swelling, elution and so forth of the housing material caused by chemical is affected by the surface area of the housing material that is in contact with the chemical, and significant changes also appear in weight and dimensions. Therefore, in the present invention, weight change per unit surface area and rate of change of thickness are used as indicators of chemical resistance of the housing material.

The chemical resistance test consists of immersing a housing material test piece in a chemical (having a liquid volume of 8 ml per 1 cm² of test piece surface area) for 6 months at room temperature, performing sampling and measuring weight and dimensions, and calculating according to the following equations 3 and 4.

Weight change per unit surface area (mg/cm²)={weight of housing material test piece after immersion (mg)−weight of housing material test piece before immersion (mg)}/surface area of housing material test piece before immersion (cm²)   Equation 3:

Rate of change of thickness (%)=[{thickness of housing material test piece after immersion (mm)−thickness of housing material test piece before immersion (mm))/thickness of housing material test piece before immersion (mm)]×100   Equation 4:

In the case the weight change per unit surface area after immersing in chemical is greater than +20 mg/cm², the housing material swells due to penetration of chemical causing separation of the housing material and potting material and disintegration of the housing. On the other hand, in the case the weight change per unit surface area decreases by more than −20 mg/cm², elution of the housing material occurs, which causes variations in the deaerated chemical composition. In addition, as disintegration of the housing advances, it may no longer be able to separate the one side and the other of the hollow fiber membrane in a fluid-tight or airtight manner.

In addition, in the case the rate of change in thickness after immersing in a chemical is greater than +15%, the housing material swells due to penetration of chemical, and in the case it decreases by more than −15%, elution of the housing material occurs.

The plastic, polyolefin, is preferably used for the housing material in the present invention. Polyolefins are generally known to have high durability with respect to organic solvents and other chemicals, and are able to extend the service life of the module. In addition, polyethylene and cycloolefin polymer are particularly preferable examples of polyolefins because of their durability with respect to various chemicals and their low content of metal and other impurities.

Chemicals used in the chemical resistance test in the present invention are target solutions for which resistance is required depending on the application of the hollow fiber membrane module, examples of which include organic solvents such as methanol, ethanol, isopropyl alcohol, butanol, methyl ethyl ketone, ethyl cellosolve, ethyl lactate, propylene glycol monomethyl ether and propylene glycol monomethyl ether acetate, photoresist, semiconductor developing solution, printer ink and liquid crystal. More specifically, isopropyl alcohol, semiconductor developing solution {water/tetramethyl ammonium hydroxide=98/2 (wt %)}, spin-on-glass solution {isopropyl alcohol/tetraethoxysilane/water=70/2/28 (wt %)}, printer ink (water/ethylene glycol/isopropyl alcohol=80/5/15 (wt %)}, liquid crystal {cholesteryl chloride, cholesteryl nonanoate}, photoresist thinner{propylene glycol monomethyl ether/propylene glycol monomethyl ether acetate=70/30 (wt %)} and so forth are applied.

In addition, in the case of using a hollow fiber membrane module for deaeration treatment of a chemical, elution of metals contained as impurities in the housing material into the chemical is a major problem. In order to inhibit this elution of metal into the chemical, it is preferably preferable to use a housing material that has a low content of metal present therein. The total content of metal present in the housing material is preferably 300 ppm or less. The metal content is preferably 100 ppm or less, and more preferably 50 ppm or less. If the metal content exceeds 300 ppm, metal or metal compounds elute into the chemical resulting in the possibility of contaminating the chemical.

The metal content in the present invention refers to the amount of metal contained as metal elements. Examples of target metal elements include the alkaline metals of Na and K, the alkaline earth metals of Mg and Ca, the transition metals of Ti, Cr, Mn, Fe, Ni, Cu and Zn, and each of the metal elements of Al, Sn and Pb. Thus, the metal content refers to the sum of the contents of each metal element as determined from analysis values of those respective metal elements. In addition, there are no particular restrictions on the methods for analyzing each metal element.

Furthermore, in the case of low adhesion between the housing material and potting material, a primer can be used to perform primer treatment.

Next, an explanation is provided of the hollow fiber membrane used for deaerating chemicals.

Figure 2:
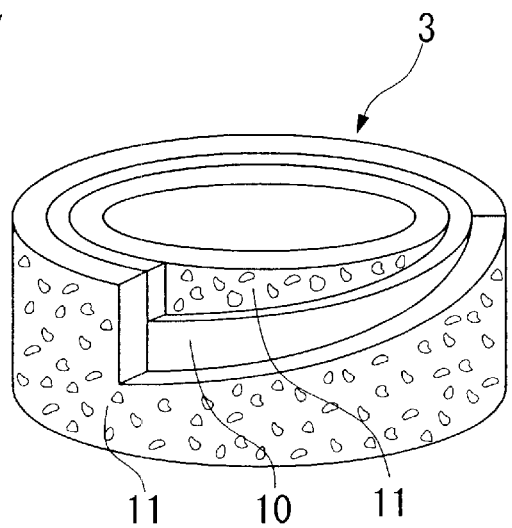
FIG. 2 is a perspective view showing one example of the hollow fiber membrane used in the present invention.

Hollow fiber membrane 3, which is an example of a hollow fiber membrane used in the present invention shown in FIG. 2, has a composite structure in which homogeneous thin film 10 is juxtapositioned on both sides between porous support layers 11.

Porous support layers 11 and homogeneous thin film 10 need only be disposed in the state in which they make contact, are not required to be affixed by adhesive and so forth, and their form is maintained in the case of using for chemical deaeration.

On the contrary, if the porous support layers and homogeneous thin film are affixed with adhesive, the gas permeability of the homogeneous thin film decreases easily due to the presence of the adhesive layer. A decrease in gas permeability of the homogeneous thin film is unsuitable since this causes a decrease in deaeration performance.

Homogeneous thin film 10 is free of pin holes or micropores and has superior gas permeability. Moreover, homogeneous thin film 10 is protected by porous support layers 11 having low resistance to permeation of gas and mechanical strength. Thus, there is no occurrence of leakage of chemical from pores that occurs when deaeration has been performed using a membrane composed only of porous pores, nor is there any occurrence of pin hole formation in the homogeneous thin film caused by mechanical wear.

The film thickness of the homogeneous thin film is preferably from 1 to 10 μm. If the film thickness is less than 1 μm, there tends to be insufficient resistance to pressure during use, while if the thickness is greater than 10 μm, gas permeability tends to be inadequate, although dependent upon the material used.

In addition, the thickness of the porous support layers is preferably such that the thickness of one layer is from 10 to 50 μm. The porosity of the support layers is preferably from 10 to 50 vol %.

Moreover, a hollow fiber membrane in which the transmission rate ratio, defined as the ratio of the oxygen transmission rate to the nitrogen transmission rate (the oxygen transmission rate/the nitrogen transmission rate), is 1.1 or more, and the rate of change in said transmission rate ratio after immersing in chemical is within the range of −15 to +30%, is preferably used for the hollow fiber membrane.

Here, the gas transmission rate is the value determined by supplying pure oxygen or nitrogen gas to the hollow fiber membrane and measuring transmission rate in compliance with ASTM D1434.

If the transmission rate ratio is 1.1 or more, there is no occurrence of chemical leakage and deaeration performance suitable for practical use is demonstrated. On the other hand, if the transmission rate ratio is less than 1.1, pin holes form in a portion of the homogeneous thin film. In particular, in the case this value is less than 0.93, pin holes can form of a size approaching the mean free path of oxygen and nitrogen molecules in the entire homogeneous thin film, resulting in greater susceptibility to chemical leakage.

In addition, it is suitable to use the change in transmission rate ratio and the weight change rate as indicators of chemical resistance of the hollow fiber membrane. These values are calculated according to formulas 5 and 6 below after immersing the hollow fiber membrane in a chemical for 6 months at room temperature, namely 23° C., followed by sampling and measurement of data.

Change in transmission rate ratio of hollow fiber membrane (%)= {transmission rate ratio after immersion−transmission rate ratio before immersion}×100/transmission rate ratio before immersion     Equation 5:

Weight change rate of hollow fiber membrane (%)={weight of hollow fiber membrane after immersion−weight of hollow fiber membrane before immersion}×100/weight of hollow fiber membrane before immersion     Equation 6:

In addition, the rate of change in transmission rate ratio after immersion in chemical substantially indicates the durability of the homogeneous thin film to chemical, and if within the range of −15 to +30%, the homogeneous thin film is durable with respect to chemical. In the case the rate of change decreases by more than −15%, pin holes form in the homogeneous thin film, and in the case it is greater than +30%, swelling occurs.

A hollow fiber membrane in which the weight change rate of said membrane after immersing in chemical is within the range of −30 to +30% is preferably used for the hollow fiber membrane used in the present invention.

The weight change rate substantially represents the weight change of the porous support layers. If the weight change rate is within the range of −30 to +30%, the porous support layers are durable to chemical, and mechanical strength is maintained that can withstand practical use. In contrast, if the weight change rate decreases by more than −30%, pin holes form due to elution and so forth, and in the case the weight change rate is greater than +30%, swelling occurs. In any case, the hollow fiber membrane is destroyed due to inadequate mechanical strength, thereby resulting in the possibility of chemical leakage.

In addition, the hollow fiber membrane used in the present invention is preferably such that the nitrogen transmission rate is $0.5 \times 10^{-9}$ cm$^3$/cm$^2$·Pa·sec or more, and the oxygen transmission rate is $0.6 \times 10^{-9}$ cm$^3$/cm$^2$·Pa·sec or more.

Reducing the chemical dissolved gas concentration following deaeration to 50% or less of the saturated solubility at atmospheric pressure is generally required as the level of deaeration when deaerating dissolved nitrogen gas and oxygen gas in a chemical. In the case of not attaining this level, the dissolved gas in the chemical easily forms bubbles. In the case of printer ink in particular, a high level of deaeration is required to prevent printing omissions, and the concentration of dissolved gas is preferably reduced to 10% of or less of the saturated solubility at atmospheric pressure. A nitrogen transmission rate of $0.5 \times 10^{-9}$ cm$^3$/cm$^2$·Pa·sec or more, and an oxygen transmission rate of $0.6 \times 10^{-9}$ cm$^3$/cm$^2$·Pa·sec or more are required to deaerate the chemical to such level. If the transmission rates of oxygen and nitrogen are lower than the above values, the target level of deaeration is not attained.

Examples of materials for the porous support layers of the hollow fiber membrane used in the present invention include polyolefins, particularly such as polyethylene, polypropylene and poly(4-methylpentene-1), polyvinylidene fluoride and polyoxymethylene. These polymers demonstrate superior resistance to chemicals.

Examples of the material for the homogeneous thin film of the hollow fiber membrane include the five types of thermoplastic polymers indicated below.

The first homogeneous thin film material is a blended polymer composed of thermoplastic styrene elastomer and polyolefin. This blended polymer can be formed on the homogeneous thin film, and the resulting thin film has superior chemical resistance and is able to deaerate dissolved gas at a practical level of deaeration.

The thermoplastic styrene elastomer can be used by suitably selecting from the two structures indicated below.

A) Block copolymer comprised of styrene polymer as the hard segment and at least one type of polymer selected from butadiene, ethylene-butylene, isoprene and ethylene-propylene as the soft segment.

B) Random copolymer comprised of at least two types of structural units consisting of at least one type selected from butadiene, ethylene-butylene, isoprene and ethylene-propylene, and styrene.

A polymer obtained by melting and blending the above thermoplastic styrene elastomer and polyolefin having a density of 0.9 g/cm$^3$ or less can be used as the material for the homogeneous thin film.

By melting and blending polyolefin into the thermoplastic styrene elastomer, both molecular chains mutually penetrate resulting in a three-dimensional network structure that inhibits dissolution in chemical and swelling. A material suitably selected from high-density polyethylene, isotactic polypropylene, polyoxymethylene and highly crystalline poly(4-methylpentene-1), etc. can be used for the porous support layers in this case.

The second homogeneous thin film material is a copolymer of (2,2-bistrifluoromethyl-4,5-difluoro-1,3-dioxol) and tetrafluoroethylene. A material suitably selected from poly (4-methylpentene-1), polypropylene and polyvinylidene fluoride, etc. is preferably used for the porous support layers in this case.

The third homogeneous thin film material is a thermoplastic fluororesin elastomer. The thermoplastic fluororesin elastomer referred to here is comprised of fluororesin as the hard segment and fluororubber as the soft segment. Examples of fluororesins of the hard segment include ethylene-tetrafluoroethylene copolymer and polyvinylidene fluoride. In addition, examples of fluororubber of the soft segment include vinylidene fluoride-hexafluoropropylene copolymer and vinylidene fluoride-hexafluoropropylene-tetrafluoroethylene terpolymer. Materials suitably selected from highly stereoregular polypropylene, highly crystalline poly(4-methylpentene-1) and polyvinylidene fluoride, etc. are suitably used for the porous support layers in this case.

The fourth homogeneous thin film material is low crystalline poly(4-methylpentene-1). Examples of low crystalline poly(4-methylpentene-1) include copolymers of 4-methyl-1-pentene and higher olefins (such as octene and other α-olefins).

A material suitably selected from highly crystalline poly (4-methylpentene-1) homopolymer, highly crystalline (4-methylpentene-1)-(α-olefin) copolymer and polyvinylidene fluoride, etc. are preferably used for the porous support layers in this case.

A fifth homogeneous thin film material is a thermoplastic polyolefin elastomer. The thermoplastic polyolefin elastomer referred to here is a copolymer comprised of polyolefins only. Examples include a copolymer of ethylene and octene, copolymer of propylene and octene, copolymer of ethylene and propylene and other copolymers of propylene and higher olefins.

A material suitably selected from high-density polyethylene, highly stereoregular polypropylene and polyoxymethylene, etc. is preferably used for the porous support layers in this case.

In addition, in the case of using photoresist solution or developing solution as the chemical, it is preferable that at least the portion of the hollow fiber membrane that contacts the chemical be composed of polyolefin. Photoresist solution and developing solution frequently contain fluorine-based nonionic surfactant as leveling agent. However, fluorine-containing polymers such as polytetrafluoroethylene widely used as a material of hollow fiber membranes in the prior art have the property of adsorbing fluorine-based nonionic surfactant. Consequently, if a hollow fiber membrane composed of a fluorine-containing polymer is used for deaeration treatment of photoresist solution or developing solution, the photoresist solution or developing solution that is deaerated may cause defective leveling. Thus, defective leveling of deaerated photoresist solution or developing solution can be prevented by using a polyolefin demonstrating little adsorption of nonionic fluorosurfactant at least for the portion of the hollow fiber membrane that contacts the chemical.

In addition, preferable examples of this polyolefin include polyethylene, polypropylene and poly(4-methylpentene-1) since they demonstrate little adsorption of nonionic fluorosurfactant. An example of a nonionic fluorosurfactant is Fluorad made by Sumitomo 3M (FC-430: fluorinated alkyl ester).

The hollow fiber membrane having a composite structure as described above can be obtained by melting and spinning, for example, a polymer that forms a homogeneous thin film and a polymer that forms porous support layers using a multiple cylindrical spinning nozzle(s) of a polymer arrangement in which the polymer for forming the homogeneous thin layer is juxtapositioned on both sides by the polymer for forming the porous support layers, followed by drawing under conditions that only the polymer for forming the porous support layers promote porosity.

The hollow fiber membrane module of the present invention is produced, for example, in the manner described below.

Figure 3:
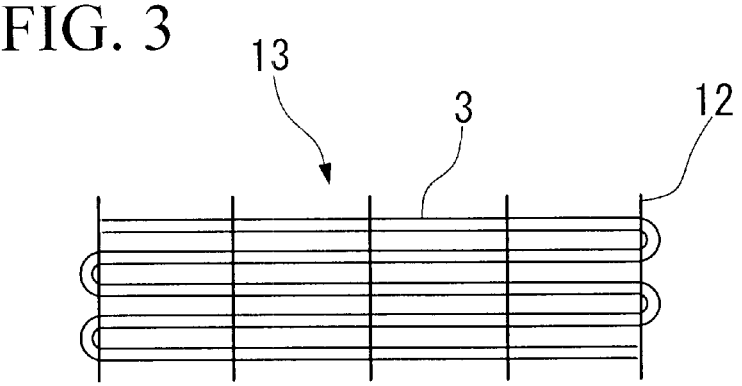
FIG. 3 is an overhead view showing one example of a woven sheet.

To begin with, as shown in FIG. 3, hollow fiber membrane 3 is woven with overcasting thread 12 to produce woven sheet 13. In this case, as shown in the drawing, woven sheet 13 may be formed by overcasting hollow fiber membrane 3 with overcasting thread 12 while going back and forth through a single hollow fiber membrane 3, or woven sheet 13 may be formed by grouping an arbitrary number of hollow fiber membranes into a bundle, gathering them together and then using overcasting thread 12 to go back and forth among them. Furthermore, there are no particular restrictions on the type of overcasting thread 12 used provided it is a multi-filament thread made of synthetic fiber such as polyester fiber, etc., is flexible and does not damage the hollow fiber membrane.

The woven sheet 13 produced in this manner is then wound into a roll to form a layered roll so that the axial direction of the fibers of the hollow fiber membrane is aligned. After installing this within a cylindrical housing, a specified potting material is injected into both ends of the layered roll followed by curing. After the potting material has cured, a hollow fiber membrane module can be obtained in which both ends of the hollow fiber membrane are open by cutting the ends of each fixed portion.

Furthermore, although an example, of a cylindrical hollow fiber membrane module is used in the above explanation, the hollow fiber membrane module of the present invention is not limited to this shape. In addition, a housing in which the chemical inlet and outlet as well as the exhaust port and so forth are integrated into a single unit may be used for the housing, or a module can be formed without the use of a housing.

The hollow fiber membrane module of the present invention is particularly suitable for deaeration of dissolved gases from a chemical in, for example, a semiconductor production process, printer, liquid crystal sealing process or chemical production process.

An example of deaeration treatment using the hollow fiber membrane module described above is explained using FIG. 4.

In this example, hollow fiber membrane module 1 is used by installing in drum 17 equipped with chemical inlet 14, chemical outlet 15 and exhaust port 16. Nitrogen gas is supplied from nitrogen feed pipe 20 to chemical 19 stored in chemical tank 18, and the chemical is supplied to hollow fiber membrane module 1 through chemical feed pipe 21 using the pressure of nitrogen gas as the driving force. Chemical enters through chemical inlet 14 of drum 17, passes through the hollow portion of the hollow fiber membrane of hollow fiber membrane module 1, and leaves from chemical outlet 15. At this time, the outside of the hollow fiber membrane is reduced in pressure to a degree of vacuum of, for example, 100 Pa, by vacuum pump 22 connected to exhaust port 16 of drum 17, and deaerated chemical is obtained from chemical outlet 15.

Furthermore, although chemical is supplied to the hollow portion of the hollow fiber membrane in the above example, chemical may also be supplied outside the hollow fiber membrane.

Next, another embodiment of a hollow fiber membrane module of the present invention is shown.

Figure 5:
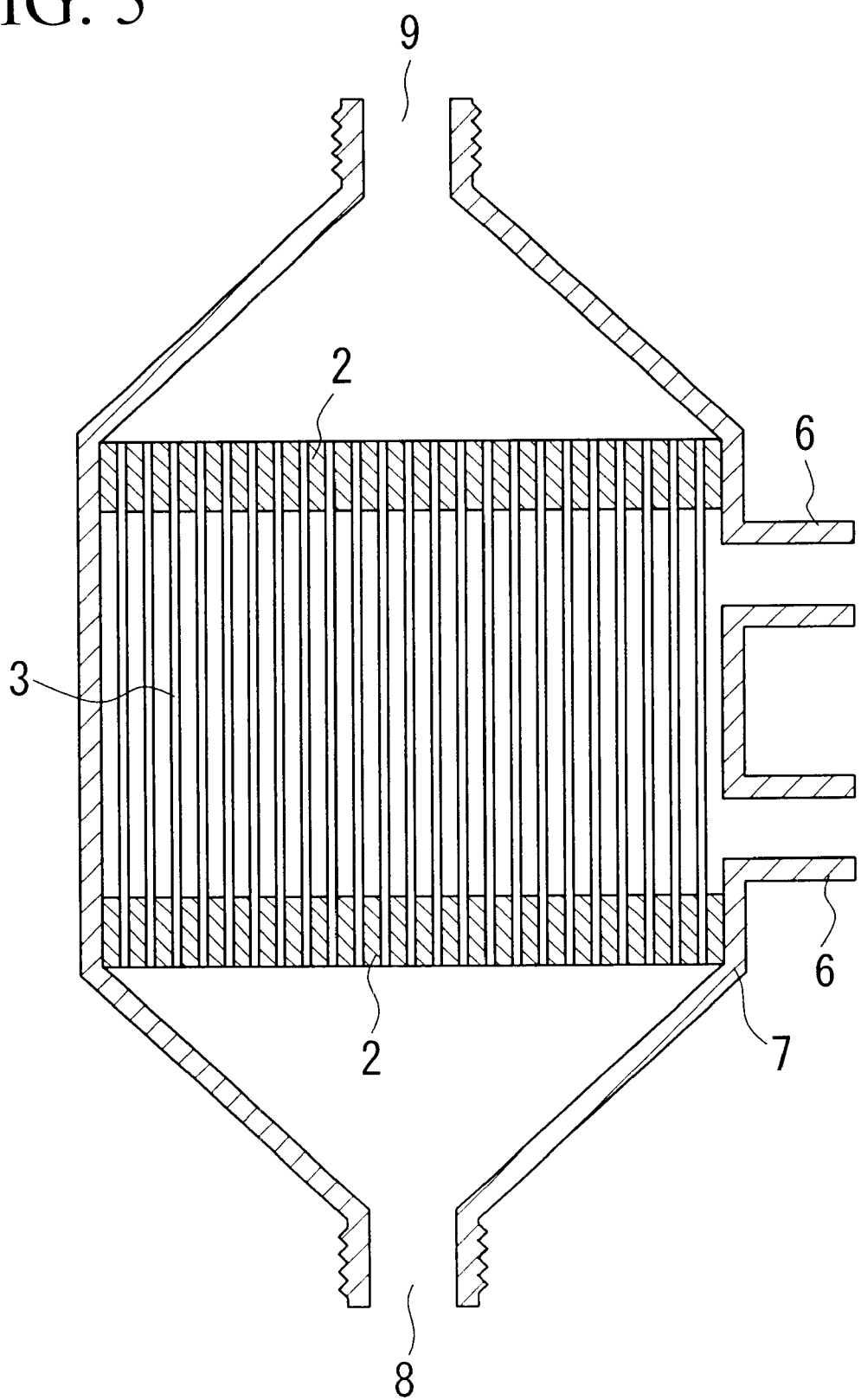
FIG. 5 is a cross-sectional view showing one example of the hollow fiber membrane module of the present invention.

FIG. 5 is a cross-sectional view showing a different example of a hollow fiber membrane module to which the present invention is applied. Hollow fiber membrane 3 is housed inside cylindrical housing 7 having exhaust ports 6. Hollow fiber membrane 3 is fixed inside housing 7 by potting materials 2 in the state in which both of its ends are open. Chemical inlet port 8 and chemical outlet port 9 are provided integrated into a single unit with housing 7 on both ends of housing 7.

Chemical can be deaerated by introducing chemical through chemical inlet port 8 of this hollow fiber membrane module, and passing chemical through the inside of hollow fiber membrane 3 while reducing the pressure through exhaust ports 6. Alternatively, chemical can be deaerated by passing chemical through the outside of hollow fiber membrane 3 while reducing the pressure inside the hollow fiber membrane through the openings on both ends. When passing liquid through the outside of the hollow fiber membrane and reducing the pressure inside the hollow fiber membrane, one of the exhaust ports 6 shown in FIG. 5 becomes the chemical inlet port, while the other exhaust port 6 becomes the chemical outlet port, while both chemical inlet port 8 and chemical outlet port 9 serve as exhaust ports.

EMBODIMENTS

The following provides a detailed explanation of the present invention through its embodiments. Furthermore, quantitative determination of the amounts of metal in the potting material, housing material and chemical in the embodiments was performed using ICP analysis.

Embodiment 1

Polysulfide modified epoxy resin ("Flep 10", Toray Thiokol Co., Ltd.), bisphenol epoxy resin ("Epicote 828", Yuka Shell Epoxy Co., Ltd.) and aromatic polyamine curing agent ("Ankamine 1833", BTR Japan) were mixed at a weight ratio of 33.5:53.1:13.4 and then degassed to produce a resin plate. After allowing the resin plate to stand overnight at room temperature, it was cured by heating for 6 hours at 80° C. The cured resin plate was cut to a size of 60×8×2 mm to produce a test piece of a chemical resistance test.

The results of a chemical resistance test on this potting material are shown in Tables 1 and 2. The chemical resistance test was performed by immersing the above test piece in various chemicals at 23° C. followed by measurement of the weight change and rate of change in thickness after 3 and 6 months. In addition, metal contents are shown in Table 5.

Embodiment 2

With the exception of mixing sorbitol polyglycidyl ether ("Erisys GE-60", BTR Japan), urethane modified epoxy resin ("TSR243", Dainippon Ink and Chemicals, Inc.) and alicyclic polyamine curing agent ("Ankamine 2049", BTR Japan) at a weight ratio of 38.0:38.0:24.0, a test piece was produced in the same manner as Embodiment 1.

The results of a chemical resistance test on this potting material are shown in Tables 1 and 2. The chemical resistance test was performed by immersing the above test piece in various chemicals at 23° C. followed by measurement of the weight change and rate of change in thickness after 3 and 6 months. In addition, metal contents are shown in Table 5.

Embodiment 3

With the exception of mixing the above "Epicote 828", "Erisys GE-60" and "Ankamine 1833" at a weight ratio of 44.0:39.4:16.6, a test piece was produced in the same manner as Embodiment 1. The results of a chemical resistance test on this potting material are shown in Tables 1 and 2. The chemical resistance test was performed by immersing the above test piece in various chemicals at 23° C. followed by measurement of the weight change and rate of change in thickness after 3 and 6 months. In addition, metal contents are shown in Table 5.

Embodiment 4

With the exception of mixing the above "Flep 10", "Epicote 828" and BF$_3$ modified amine complex ("Anchor 1170", BTR Japan) at a weight ratio of 65.5:34.5:5.0, a test piece was produced in the same manner as Embodiment 1.

The results of a chemical resistance test on this potting material are shown in Tables 1 and 2. The chemical resistance test was performed by immersing the above test piece in various chemicals at 23° C. followed by measurement of the weight change and rate of change in thickness after 3 and 6 months. In addition, metal contents are shown in Table 5.

Comparative Example 1

With the exception of mixing a base compound ("Coronate 4403", Nippon Polyurethane Industry Co., Ltd.), a curing agent ("Nippollan 4224", Nippon Polyurethane Industry Co., Ltd.) and lead octenate as a catalyst at a weight ratio of 60:40:0.1, a test piece was produced in the same manner as Embodiment 1.

The results of a chemical resistance test on the resulting potting material are shown in Tables 3 and 4. The chemical resistance test was performed by immersing the above test piece in various chemicals at 23° C. followed by measurement of the weight change and rate of change in thickness after 3 and 6 months. In addition, metal contents are shown in Table 5.

Embodiment 5

With the exception of mixing the above "Epicote 828", modified alicyclic polyamine curing agent ("Ankamine 1618") and alumina as an inorganic filler at a weight ratio of 32.5:37.5:15.0, a test piece was produced in the same manner as Embodiment 1.

The results of a chemical resistance test on the resulting potting material are shown in Tables 3 and 4. The chemical resistance test was performed by immersing the above test piece in various chemicals at 23° C. followed by measurement of the weight change and rate of change in thickness after 3 and 6 months. In addition, metal contents are shown in Table 5.

Comparative Example 2

With the exception of mixing the above "Epicote 828" and modified alicyclic polyamine curing agent ("Ankamine 1618", BTR Japan) at a weight ratio 62.5:37.5, a test piece was produced in the same manner as Embodiment 1.

The results of a chemical resistance test on the resulting potting material are shown in Tables 1 and 2. The chemical resistance test was performed by immersing the above test piece in various chemicals at 23° C. followed by measurement of the weight change and rate of change in thickness after 3 and 6 months.

Comparative Example 3

With the exception of mixing the above "Epicote 828" and alicyclic polyamine curing agent ("PACM", BTR Japan) at a weight ratio 78.1:21.9, a test piece was produced in the same manner as Embodiment 1.

The results of a chemical resistance test on the resulting potting material are shown in Tables 1 and 2. The chemical resistance test was performed by immersing the above test piece in various chemicals at 23° C. followed by measurement of the weight change and rate of change in thickness after 3 and 6 months.

Comparative Example 4

With the exception of mixing the above "Epicote 828" and polyamide curing agent ("Ankamide 375A", BTR Japan) at a weight ratio of 64.5:35.5, a test piece was produced in the same manner as Embodiment 1.

The results of a chemical resistance test on the resulting potting material are shown in Tables 1 and 2. The chemical resistance test was performed by immersing the above test piece in various chemicals at 23° C. followed by measurement of the weight change and rate of change in thickness after 3 and 6 months.

The types of chemicals in Tables 1 and 2 are as shown below.

A: Isopropyl alcohol

B: Semiconductor developing solution

C: Spin-on-glass solution

D: Printer ink

E: Liquid crystal

F: Photoresist thinner

TABLE 1

Weight change per unit surface area of potting material test piece after immersing for 3 months (mg/cm$^2$)

| Chemical | A | B | C | D | E | F |
|---|---|---|---|---|---|---|
| Embodiment 1 | −0.201 | −0.110 | −0.125 | −0.148 | −0.092 | −0.245 |
| Embodiment 2 | +2.33 | +0.66 | +2.01 | +0.91 | +1.01 | +10.9 |
| Embodiment 3 | +0.210 | +0.115 | +0.385 | +0.169 | +0.122 | +0.461 |
| Embodiment 4 | −0.209 | −0.075 | −0.140 | −0.099 | −0.036 | −0.227 |
| Comp. Ex. 2 | +29.2 | +12.5 | +28.5 | +17.5 | +9.69 | * |
| Comp. Ex. 3 | +18.6 | +11.6 | +18.1 | +14.2 | +9.20 | +22.5 |
| Comp. Ex. 4 | +9.66 | +14.3 | +8.81 | +8.20 | +13.7 | +18.5 |

Weight change per unit surface area of potting material test piece after immersing for 6 months (mg/cm$^2$)

| Chemical | A | B | C | D | E | F |
|---|---|---|---|---|---|---|
| Embodiment 1 | −0.213 | −0.105 | −0.201 | −0.153 | −0.103 | −0.271 |
| Embodiment 2 | +3.01 | +1.01 | +2.50 | +1.98 | +1.20 | +16.7 |
| Embodiment 3 | +0.421 | +0.252 | +0.402 | +0.331 | +0.258 | +0.551 |
| Embodiment 4 | −0.250 | −0.129 | −0.250 | −0.187 | −0.134 | −0.321 |
| Comp. Ex. 2 | * | +23.9 | * | * | +21.5 | * |
| Comp. Ex. 3 | * | +24.0 | * | * | +22.0 | * |
| Comp. Ex. 4 | * | +22.0 | * | * | +21.0 | * |

*: Did not retain shape

TABLE 2

Rate of change in thickness of potting material test piece after immersing for 3 months (%)

| Chemical | A | B | C | D | E | F |
|---|---|---|---|---|---|---|
| Embodiment 1 | −1.105 | −0.038 | −0.090 | −0.062 | −0.033 | −0.835 |
| Embodiment 2 | +2.07 | +1.33 | +3.56 | +1.23 | +0.68 | +8.52 |
| Embodiment 3 | +0.853 | +0.044 | +0.185 | +0.033 | +0.039 | +0.596 |
| Embodiment 4 | −0.904 | −0.047 | −0.101 | −0.048 | −0.051 | −0.469 |
| Comp. Ex. 2 | +14.5 | +10.5 | +18.8 | +15.7 | +9.37 | * |
| Comp. Ex. 3 | +14.1 | +9.94 | +16.1 | +8.96 | +5.52 | +17.8 |
| Comp. Ex. 4 | +9.95 | +3.77 | +11.2 | +7.38 | +5.04 | +13.6 |

Rate of change in thickness of potting material test piece after immersing for 6 months (%)

| Chemical | A | B | C | D | E | F |
|---|---|---|---|---|---|---|
| Embodiment 1 | −1.181 | −0.041 | −0.091 | −0.060 | −0.040 | −1.202 |
| Embodiment 2 | +4.64 | +1.98 | +4.02 | +2.52 | +2.00 | +12.6 |
| Embodiment 3 | +1.198 | +0.041 | +0.211 | +0.081 | +0.042 | +1.232 |
| Embodiment 4 | −1.135 | −0.051 | −0.121 | −0.090 | −0.056 | −1.234 |
| Comp. Ex. 2 | * | +17.2 | * | * | +15.2 | * |
| Comp. Ex. 3 | * | +17.5 | * | * | +15.5 | * |
| Comp. Ex. 4 | * | +16.8 | * | * | +15.3 | * |

*: Did not retain shape

TABLE 3

Weight change per unit surface area of potting material test piece after immersing for 3 months (mg/cm$^2$)

| Chemical | A | B | C | D | E | F |
|---|---|---|---|---|---|---|
| Comp. Ex. 1 | +27.3 | −13.2 | * | +17.5 | +8.51 | * |
| Embodiment 5 | +8.3 | +4.2 | +7.5 | +2.1 | +1.5 | +8.62 |

Weight change per unit surface area of potting material test piece after immersing for 6 months (mg/cm$^2$)

| Chemical | A | B | C | D | E | F |
|---|---|---|---|---|---|---|
| Comp. Ex. 1 | * | −28.5 | * | +30.9 | +25.2 | * |
| Embodiment 5 | +10.8 | +6.5 | +9.5 | +4.5 | +3.6 | +13.6 |

*: Did not retain shape

TABLE 4

Rate of change in thickness of potting material test piece after immersing for 3 months (%)

| Chemical | A | B | C | D | E | F |
|---|---|---|---|---|---|---|
| Comp. Ex. 1 | +10.2 | −4.67 | * | +11.9 | +5.09 | * |
| Embodiment 5 | +1.6 | +0.59 | +1.3 | +2.7 | +0.48 | +5.3 |

Rate of change in thickness of potting material test piece after immersing for 6 months (%)

| Chemical | A | B | C | D | E | F |
|---|---|---|---|---|---|---|
| Comp. Ex. 1 | * | −18.6 | * | +26.8 | +19.8 | * |
| Embodiment 5 | +6.5 | +2.0 | +4.2 | +3.9 | +1.8 | +10.5 |

*: Did not retain shape

TABLE 5

Metal content of potting material (ppm)

| Metal | Emb. 1 | Emb. 2 | Emb. 3 | Emb. 4 | Comp. Ex. 1 | Emb. 5 |
|---|---|---|---|---|---|---|
| Na | 20 | 17 | 18 | 25 | 5 | 35 |
| K | — | — | — | — | — | — |
| Mg | — | — | — | — | 6 | 12 |
| Ca | — | — | — | — | 10 | 11 |
| Ti | — | — | — | — | — | — |
| Cr | — | — | — | — | — | — |
| Mn | — | — | — | — | — | — |
| Fe | 4 | 6 | 6 | 9 | 18 | 24 |
| Ni | 1 | 2 | 2 | 3 | 7 | — |
| Cu | — | — | — | — | — | — |
| Zn | — | — | — | — | — | — |
| Al | — | — | — | 3 | — | $6.3 \times 10^4$ |
| Sn | — | — | — | — | — | — |
| Pb | 2 | 4 | 1 | 5 | 580 | 18 |
| Total | 27 | 29 | 27 | 45 | 626 | $6.3 \times 10^4$ |

—: Not detected

Embodiment 6

The respective weight changes per unit surface area and rates of change in thickness are as shown in Tables 8 and 9 when a test piece (measuring 60×8×2 mm) made of cycloolefin polymer (Zeonor 1020R, Zeon Corporation) was immersed in chemicals (isopropyl alcohol, semiconductor developing solution, spin-on-glass solution, printer ink, liquid crystal and photoresist thinner) at 23° C. for 3 months and 6 months.

In addition, the metal contents in the cycloolefin polymer (Zeonor 1020R, Zeon Corporation) are as shown in Table 6.

TABLE 6

| Metal | Na | K | Mg | Ca | Ti | Cr | Mn | Fe | Ni | Cu | Zn | Al | Sn | Pb | Total |
|---|---|---|---|---|---|---|---|---|---|---|---|---|---|---|---|
| Content (ppm) | — | — | — | — | — | — | — | 0.02 | — | — | — | — | — | — | 0.02 |

—: Not detected

Comparative Example 5

The respective weight changes per unit surface area and rates of change in thickness are as shown in Tables 8 and 9 when a polycarbonate test piece (measuring 60×8×2 mm) was immersed in chemicals (isopropyl alcohol, semiconductor developing solution, spin-on-glass solution, printer ink, liquid crystal and photoresist thinner) at 23° C. for 3 months and 6 months. In addition, the metal contents in the polycarbonate are as shown in Table 7.

TABLE 7

| Metal | Na | K | Mg | Ca | Ti | Cr | Mn | Fe | Ni | Cu | Zn | Al | Sn | Pb | Total |
|---|---|---|---|---|---|---|---|---|---|---|---|---|---|---|---|
| Content (ppm) | 48 | 8 | 32 | 40 | — | — | — | 87 | 29 | — | — | 17 | 47 | — | 308 |

—: Not detected

TABLE 8

| | Weight change per unit surface area of housing material test piece after immersing for 3 months (mg/cm$^2$) | | | | | |
|---|---|---|---|---|---|---|
| Chemical | A | B | C | D | E | F |
| Embodiment 6 | +0.162 | +0.107 | +0.195 | +0.075 | +0.092 | +0.448 |
| Comp. Ex. 5 | Disintegrated | Disintegrated | +18.3 | +11.5 | +10.3 | Disintegrated |

| | Weight change per unit surface area of potting material test piece after immersing for 6 months (mg/cm$^2$) | | | | | |
|---|---|---|---|---|---|---|
| Chemical | A | B | C | D | E | F |
| Embodiment 6 | +0.354 | +0.105 | +0.247 | +0.118 | +0.127 | +0.749 |
| Comp. Ex. 5 | Disintegrated | Disintegrated | Disintegrated | +26.1 | +22.6 | Disintegrated |

TABLE 9

| | Rate of change in thickness of housing material test piece after immersing for 3 months (%) | | | | | |
|---|---|---|---|---|---|---|
| Chemical | A | B | C | D | E | F |
| Embodiment 6 | +0.133 | +0.051 | +0.205 | +0.063 | +0.052 | +0.274 |
| Comp. Ex. 5 | Disintegrated | Disintegrated | +4.55 | +6.68 | +5.15 | Disintegrated |

| | Rate of change in thickness of housing material test piece after immersing for 6 months (%) | | | | | |
|---|---|---|---|---|---|---|
| Chemical | A | B | C | D | E | F |
| Embodiment 6 | +0.208 | +0.043 | +0.215 | +0.076 | +0.094 | +0.398 |
| Comp. Ex. 5 | Disintegrated | Disintegrated | Disintegrated | +16.9 | +15.3 | Disintegrated |

In Tables 8 and 9, A represents isopropyl alcohol, B represents semiconductor developing solution, C represents spin-on-glass solution, D represents printer ink, E represents liquid crystal, and F represents photoresist thinner.

Embodiment 7

A three-layered composite hollow fiber membrane (inner diameter: 200 μm, outer diameter: 280 μm, porosity: 50%, oxygen transmission rate: 7.5×10$^{-9}$ (cm$^3$/cm$^2$·Pa·sec), nitrogen transmission rate: 2.1×10$^{-9}$ (cm$^3$/cm$^2$·Pa·sec), transmission rate ratio: 3.6) was obtained by using a blended polymer of thermoplastic styrene elastomer and polypropylene ("MK-2F", Dainippon Plastics Co., Ltd.) for the homogeneous thin film polymer, and using high-density polyethylene ("Nipolon Hard 5110", Tosoh Corporation) for the porous support layers. The results of a chemical resistance test on the resulting three-layered composite hollow fiber membrane are shown in Table 10.

Embodiment 8

A three-layered composite hollow fiber membrane (inner diameter: 200 μm, outer diameter: 290 μm, porosity: 45%, oxygen transmission rate: 140×10$^{-9}$ (cm$^3$/cm$^2$·Pa·sec), nitrogen transmission rate: 51.9×10$^{-9}$ (cm$^3$/cm$^2$·Pa·sec), transmission rate ratio: 2.7) was obtained by using a 2,2-bistrifluoromethyl-4,5-difluoro-1,3-dioxol/tetrafluoroethylene copolymer (60/40 (mol %)) ("Teflon AF1600", Dupont) for the homogeneous thin film polymer, and using poly(4-methylpentene-1) (Mitsui Chemicals, Inc.) for the porous support layers. The results of a chemical resistance test on the resulting three-layered composite hollow fiber membrane are shown in Table 10.

TABLE 10

| Chemical | A | B | C | D | E | F |
|---|---|---|---|---|---|---|
| Embodiment 7 | | | | | | |
| Change in transmission rate ratio (%) | −2.9 | −2.9 | −2.9 | −2.9 | −2.9 | −4.4 |
| Weight change ratio (%) | +0.1 | +0.2 | +0.2 | +0.1 | +0.1 | +0.3 |
| Embodiment 8 | | | | | | |
| Change in transmission rate ratio (%) | −3.7 | −3.7 | −3.7 | −3.7 | −3.7 | −5.6 |
| Weight change ratio (%) | +0.1 | +0.1 | +0.1 | +0.1 | +0.1 | +0.15 |

Embodiment 9

A three-layered composite hollow fiber membrane (inner diameter: 200 μm, outer diameter: 280 μm, porosity: 47%, oxygen transmission rate: $3.9 \times 10^{-9}$ ($cm^3/cm^2 \cdot Pa \cdot sec$), nitrogen transmission rate: $1.1 \times 10^{-9}$ ($cm^3/cm^2 \cdot Pa \cdot sec$), transmission rate ratio: 3.5) was obtained by using a thermoplastic fluororesin elastomer ("Daiel Thermoplastic T-630", Daikin Industries, Ltd.) for the homogeneous thin film polymer, and using highly stereoregular isotactic polypropylene ("Hypol CJ700", Mitsui Chemicals, Inc.) for the porous support layers. The results of a chemical resistance test on the resulting three-layered composite hollow fiber membrane are shown in Table 11.

Embodiment 10

A three-layered composite hollow fiber membrane (inner diameter: 200 μm, outer diameter: 290 μm, porosity: 35%, oxygen transmission rate: $12.8 \times 10^{-9}$ ($cm^3/cm^2 \cdot Pa \cdot sec$), nitrogen transmission rate: $3.2 \times 10^{-9}$ ($cm^3/cm^2 \cdot Pa \cdot sec$), transmission rate ratio: 4.0) was obtained by using low crystalline poly(4-methylpentene-1) ("MX001", Mitsui Chemicals, Inc.) for the homogeneous thin film polymer, and using highly crystalline poly(4-methylpentene-1) ("RT31", Mitsui Chemicals, Inc.) for the porous support layers. The results of a chemical resistance test on the resulting three-layered composite hollow fiber membrane are shown in Table 11.

TABLE 11

| Chemical | A | B | C | D | E | F |
|---|---|---|---|---|---|---|
| Embodiment 9 | | | | | | |
| Change in transmission rate ratio (%) | −4.3 | −4.3 | −4.3 | −4.3 | −4.3 | −6.5 |
| Weight change ratio (%) | +1 | +0.1 | +0.1 | +0.1 | +0.1 | +0.15 |
| Embodiment 10 | | | | | | |
| Change in transmission rate ratio (%) | −2.5 | −2.5 | −7.5 | −2.5 | −5.0 | −9.0 |
| Weight change ratio (%) | +0.1 | +0.05 | +0.1 | +0.1 | +0.05 | +0.15 |

Embodiment 11

A three-layered composite hollow fiber membrane (inner diameter: 200 μm, outer diameter: 280 μm, porosity: 38%, oxygen transmission rate: $1.75 \times 10^{-9}$ ($cm^3/cm^2 \cdot Pa \cdot sec$), nitrogen transmission rate: $0.5 \times 10^{-9}$ ($cm^3/cm^2 \cdot Pa \cdot sec$), transmission rate ratio: 3.5) was obtained by using thermoplastic polyolefin elastomer ("Tafmer XR106L", Mitsui Chemicals, Inc.) for the homogeneous thin film polymer, and using the above "Hypol CJ700" for the porous support layers. The results of a chemical resistance test on the resulting three-layered composite hollow fiber membrane are shown in Table 12.

TABLE 11

| Chemical | A | B | C | D | E | F |
|---|---|---|---|---|---|---|
| Embodiment 11 | | | | | | |
| Change in transmission rate ratio (%) | −2.9 | −2.9 | −2.9 | −2.9 | −2.9 | −4.4 |
| Weight change ratio (%) | +0.1 | +0.1 | +0.1 | +0.1 | +0.1 | +0.15 |

Embodiment 12
(Surfactant Adsorption Test)

A surfactant adsorption test was conducted using a three-layered composite hollow fiber membrane (inner diameter: 200 μm, outer diameter: 280 μm, porosity: 50%, oxygen transmission rate: $7.5 \times 10^{-9}$ ($cm^3/cm^2 \cdot Pa \cdot sec$), nitrogen transmission rate: $2.1 \times 10^{-9}$ ($cm^3/cm^2 \cdot Pa \cdot sec$), membrane surface area: 250 $cm^2$) in which the homogeneous thin film polymer was "MK-2F" (Dainippon Plastics Co., Ltd., blended polymer of thermoplastic styrene elastomer and polypropylene), and the porous support layers were "Nipolon Hard 5110" (Tosoh Corporation, high-density polyethylene).

The test involved evaluating the degree of adsorption based on the change in the value of surface tension by immersing the three-layered composite hollow fiber membrane in ethyl lactate solution containing surfactant (concentration: 360 ppm). Fluorad FC-430 made by Sumitomo 3M (nonionic fluorosurfactant) was used for the surfactant. Surface tension after immersion is shown in Table 13.

Comparative Example 6
(Surfactant Adsorption Test)

A surfactant adsorption test was conducted in the same manner as Embodiment 12 using a polytetrafluoroethylene tube (inner diameter: 600 μm, outer diameter: 1000 μm, membrane surface area: 250 $cm^2$). Surface tension after immersion is shown in Table 13.

TABLE 13

| | Embodiment 12 | Comp. Ex. 6 | Before immersion |
|---|---|---|---|
| Surface tension (dyn/cm) | 24 | 29 | 23 |

*No addition of surfactant: 29 dyn/cm

Embodiment 13

A woven sheet like that shown in FIG. 3 (weave width: 265 mm, number of filaments: 32 fi'l, number of courses: 692) was produced using the three-layered composite hollow fiber membrane produced in Embodiment 7 for the hollow fiber membrane. After heat-setting this woven sheet, the hollow fiber membrane sheet was rolled to form a layered roll.

This was then housed in a housing having an inner diameter of 64 mm, outer diameter of 72 mm and length of 215 mm composed of the cycloolefin polymer (Zeonor 1020R, Zeon Corporation) shown in Embodiment 6 and having a large number of pores in its wall. Furthermore, pretreatment of the housing was performed by pre-coating the portion on the inside wall of the housing that adheres to the potting materials with a primer.

After mixing and degassing the potting material shown in Embodiment 1 and injecting this into a resin pot, potting was performed on both ends of the housing with a centrifugal potting apparatus (centrifugal force: 50 G, time: 2 hours, temperature: room temperature). After allowing this to stand overnight, heating was additionally performed to post-cure the potting material (temperature: 80° C., time: 6 hours). Next, the ends of the potting material were cut along with the fixed hollow fiber membrane while heating the ends to obtain a hollow fiber membrane module 1 having a structure as shown in FIG. 1 in which both ends of the hollow fiber membrane are open (membrane surface area: 2.5 $m^2$).

Embodiment 14

With the exception of using the three-layered composite hollow fiber membrane produced in Embodiment 8 for the hollow fiber membrane, using the housing material shown in Embodiment 6 and the potting material shown in Embodiment 2, and performing potting at 50° C., a hollow fiber membrane module was obtained in the same manner as Embodiment 13.

Embodiment 15

With the exception of using the three-layered composite hollow fiber membrane produced in Embodiment 9 for the hollow fiber membrane, and using the housing material shown in Embodiment 6 and the potting material shown in Embodiment 3, a hollow fiber membrane module was obtained in the same manner as Embodiment 13.

Embodiment 16

With the exception of using the three-layered composite hollow fiber membrane produced in Embodiment 10 for the hollow fiber membrane, and using the housing material shown in Embodiment 6 and the potting material shown in Embodiment 4, a hollow fiber membrane module was obtained in the same manner as Embodiment 13.

Embodiment 17

With the exception of using the three-layered composite hollow fiber membrane produced in Embodiment 11 for the hollow fiber membrane, a hollow fiber membrane module was obtained in the same manner as Embodiment 13.

Comparative Example 7

With the exception of using the three-layered composite hollow fiber membrane produced in Embodiment 7 for the hollow fiber membrane, and using the housing material shown in Comparative Example 5 and the potting material shown in Comparative Example 2, a hollow fiber membrane module was obtained in the same manner as Embodiment 13.

In addition, chemical deaeration treatment was performed using this hollow fiber membrane module on chemicals (isopropyl alcohol, semiconductor developing solution, spin-on-glass solution, printer ink, liquid crystal and photoresist thinner) under conditions of a liquid flow rate of 2 L/min. More specifically, the hollow fiber membrane module was installed in a drum container, chemical was passed through the inside of the hollow fiber membrane, and the chemicals were deaerated by reducing the pressure outside the hollow fiber membrane. Chemical deaeration treatment was carried out satisfactorily. However, contamination of each of the chemicals by metal was confirmed. The metal contents of each of the chemicals after deaeration treatment are shown in Table 14.

TABLE 14

| Chemical | Metal content in chemical after deaeration treatment (ppm) | | | | | |
|---|---|---|---|---|---|---|
|  | A | B | C | D | E | F |
| Comparative Example 7 | Na: 0.3 Ca: 1.3 Fe: 0.9 | Na: 0.4 Ca: 0.7 Fe: 1.5 | Na: 0.2 Ca: 0.8 Fe: 1.1 | Na: 1.8 Ca: 0.5 Fe: 0.8 | Ca: 0.5 Fe: 0.3 | Na: 0.2 Ca: 0.7 Fe: 1.2 |

In Table 14, A represents isopropyl alcohol, B represents semiconductor developing solution, C represents spin-on-glass solution, D represents printer ink, E represents liquid crystal, and F represents photoresist thinner.

Embodiment 18

A hollow fiber membrane module having a surface area of 0.5 $m^2$ as shown in FIG. 5 was produced using the same respective hollow fiber membrane, potting material and housing material as Embodiment 13.

Chemical deaeration treatment was performed on semiconductor developing solution and photoresist thinner, respectively, using this hollow fiber membrane module under conditions of a liquid flow rate of 2 L/min. More specifically, chemical was introduced through chemical inlet port 8 of the hollow fiber membrane module, chemical was passed through the inside of the hollow fiber membrane, and chemical was deaerated by reducing the pressure outside the hollow fiber membrane through exhaust port 6. Satisfactory deaeration treatment was performed for each chemical. Contamination of the chemicals by metal after deaeration treatment was not confirmed.

Embodiment 19

A hollow fiber membrane module was produced in the same manner as Embodiment 18 with the exception of the housing material. A polypropylene housing material was used instead. The shape was the same as that of Embodiment 18. The contents of metals present in this housing material are shown in Table 15.

TABLE 15

| Metal | Na | K | Mg | Ca | Ti | Cr | Mn | Fe | Ni | Cu | Zn | Al | Sn | Pb | Total |
|---|---|---|---|---|---|---|---|---|---|---|---|---|---|---|---|
| Content (ppm) | 8 | — | 550 | 78 | 45 | — | — | 16 | — | — | — | 66 | — | — | 763 |

Deaeration treatment was performed on semiconductor developing solution and photoresist thinner using this hollow fiber membrane module. Deaeration treatment was performed according to the same method as Embodiment 18 at a liquid flow rate of 2 L/min.

Deaeration treatment was performed satisfactorily. However, contamination of the chemicals by metal was confirmed. The metal contents of each chemical after deaeration treatment are shown in Table 16. Furthermore, metal was not detected in the chemicals before deaeration treatment.

TABLE 16

| Chemical | Metal content in chemical after deaeration treatment (ppm) | |
| --- | --- | --- |
|  | Semiconductor developing solution | Photoresist thinner |
| Embodiment 19 | Mg: 0.35, Ca: 0.05, Al: 0.29 | Mg: 0.95, Ca: 0.57, Al: 0.52 |

Usage Test Example 1

Figure 4:
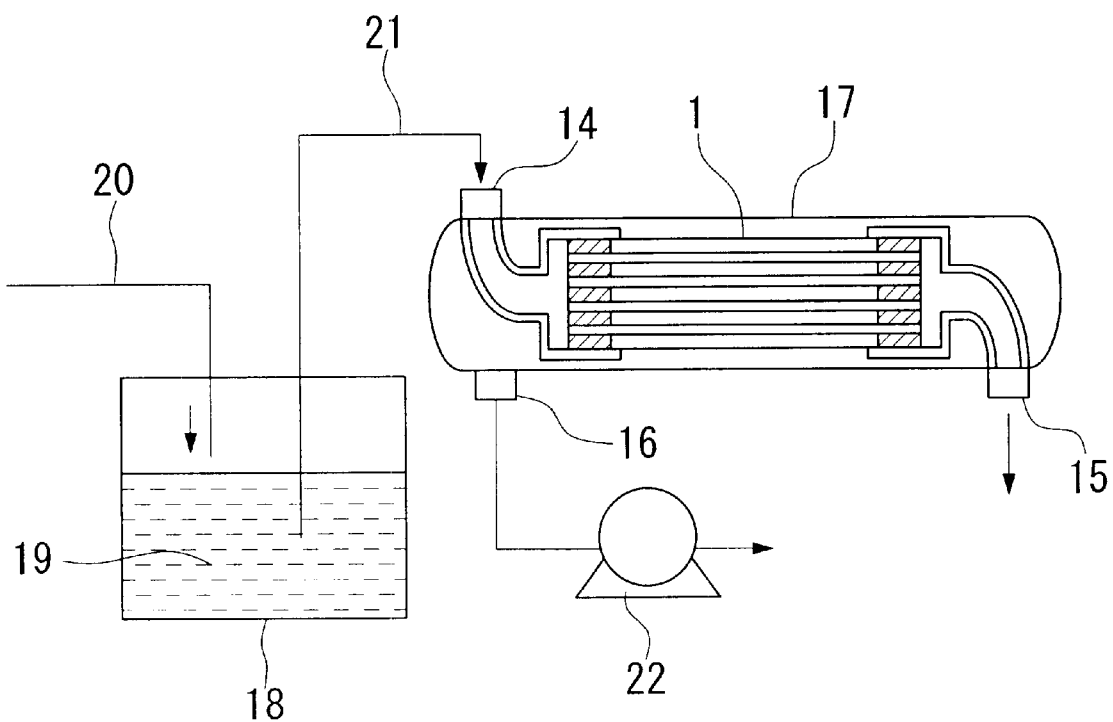
FIG. 4 is a schematic block diagram of a chemical deaeration treatment apparatus using the hollow fiber membrane module of the present invention.

The hollow fiber membrane modules produced in the above Embodiments 13 through 17 were used as a hollow fiber membrane module 1 of a chemical deaeration treatment apparatus similar to that shown in FIG. 4 to perform deaeration treatment on a semiconductor photoresist solution (chemically amplified positive resist solution, "APEX-E2405", Shipley). The nitrogen gas pressure was set at 203 kPa, and the degree of vacuum was set at 100 Pa. Metals were not detected in the photoresist solution treated using each of the hollow fiber membrane modules produced in Embodiments 13 through 17.

The deaerated resist solution was then dropped onto a silicon wafer and coated with a spin coater (rotating speed: 3000 rpm) to form a resist thin film (film thickness: 0.80 $\mu$m) on the wafer. After evaporating and drying any residual solvent in the resist thin film, a region covering 100 $\mu$m×100 $\mu$m of the resist thin film surface was observed with a scanning electron microscope.

As a result of this test, there were no surface irregularities observed in the resist film surface. In addition, there was no leakage of chemical in any of the modules. The dissolved nitrogen concentrations in the chemical before and after deaeration are shown in Table 17. Furthermore, measurement of dissolved nitrogen concentration was performed using gas chromatograph analysis.

TABLE 17

|  | Dissolved nitrogen concentration before deaeration (ppm) | Dissolved nitrogen concentration after deaeration (ppm) |
| --- | --- | --- |
| Embodiment 13 | 190 | 9.5 |
| Embodiment 14 | 190 | 3.8 |
| Embodiment 15 | 190 | 19.0 |
| Embodiment 16 | 190 | 6.3 |
| Embodiment 17 | 190 | 38.0 |

In addition, deaeration treatment was similarly performed using the hollow fiber membrane module produced in the above Comparative Example 7. Cracks formed in the potting portions due to swelling of the potting material about 1 month after the start of the test, thereby preventing deaeration processing from being performed.

Usage Test Example 2

The resist thin film obtained in the above Usage Test 1 was pre-baked for 1 minute at 90° C. followed by superimposing a photomask on the resist film and adhering by exposing to KrF excimer laser light.

The hollow fiber membrane modules produced in Embodiments 13 through 17 were each installed as hollow fiber membrane module 1 of the chemical deaeration treatment apparatus of a coater-developer for semiconductor production similar to that shown in FIG. 4 followed by deaeration treatment of aqueous tetramethyl ammonium hydroxide solution ("MF321", Shipley) (nitrogen gas pressure: 203 kPa, degree of vacuum: 100 Pa). There were no metals detected in the tetramethyl ammonium hydroxide solution treated using each of the hollow fiber membrane modules produced in Embodiments 13 through 17.

Development was performed by dropping the deaerated developing solution onto an exposure surface. The resist film obtained in development treatment was post-baked in a drying oven at 120° C., and a region covering 100 $\mu$m×100 $\mu$m of the developed surface was observed with a scanning electron microscope.

As a result of this test, there were no defects observed in the developed surface, and the shape of the resist film was such that the groove width was 0.22 $\mu$m, the land width was 0.30 $\mu$m and the groove depth was 0.5 $\mu$m. In addition, there was no occurrence of chemical leakage in any of the modules. Dissolved nitrogen concentrations in the chemical before and after deaeration are shown in Table 18.

TABLE 18

|  | Dissolved nitrogen concentration before deaeration (ppm) | Dissolved nitrogen concentration after deaeration (ppm) |
| --- | --- | --- |
| Embodiment 13 | 26.0 | 1.3 |
| Embodiment 14 | 26.0 | 0.87 |
| Embodiment 15 | 26.0 | 2.6 |
| Embodiment 16 | 26.0 | 1.3 |
| Embodiment 17 | 26.0 | 5.2 |

Usage Test Example 3

Hollow fiber membrane modules produced in the above Embodiments 13 through 17 were installed as a hollow fiber membrane module 1 of a chemical deaeration treatment apparatus similar to that shown in FIG. 4 followed by deaeration treatment of isopropyl alcohol (nitrogen gas pressure: 203 kPa, degree of vacuum: 100 Pa). There were no metals detected in the isopropyl alcohol treated using each of the hollow fiber membrane modules produced in Embodiments 13 through 17.

The deaerated isopropyl alcohol was dropped onto a silicon wafer to clean the silicon wafer. As a result of this test, there was no formation of bubbles on the resist film surface, and there was no occurrence of chemical leakage in any of the modules. The dissolved nitrogen concentrations in the chemical before and after deaeration are shown in Table 19.

TABLE 19

|  | Dissolved nitrogen concentration before deaeration (ppm) | Dissolved nitrogen concentration after deaeration (ppm) |
| --- | --- | --- |
| Embodiment 13 | 420 | 21.0 |
| Embodiment 14 | 420 | 14.0 |
| Embodiment 15 | 420 | 42.0 |
| Embodiment 16 | 420 | 21.0 |
| Embodiment 17 | 420 | 84.0 |

Embodiment 20

A hollow fiber membrane module was obtained in the same manner as Embodiment 13 with the exception of using the three-layered composite hollow fiber membrane produced in Embodiment 7 for the hollow fiber membrane, using that indicated in Comparative Example 1 for the potting material, and not performing post-curing on the potting material. Deaeration treatment was performed on the same semiconductor photoresist solution as Usage Test Example 1 using this hollow fiber membrane module according to the same method as Usage Test Example 1. As a result, Pb was detected in the photoresist solution at 0.45 ppm.

Embodiment 21

With the exception of using the three-layered composite hollow fiber membrane produced in Embodiment 7 for the hollow fiber membrane, and using that shown in Embodiment 5 for the potting material, a hollow fiber membrane module was obtained by the same method as Embodiment 13. Deaeration treatment was performed on the same aqueous tetramethyl ammonium hydroxide solution as Usage Test Example 2 using this hollow fiber membrane module according to the same method as Usage Test Example 2. As a result, Al was detected in the aqueous tetramethyl ammonium hydroxide solution at 2.9 ppm.

Industrial Applicability

Since the potting material, housing material and hollow fiber membrane of the hollow fiber membrane module of the present invention have superior chemical resistance, the module can be used to treat chemicals for a long period of time without the occurrence of leaks in the module.

In particular, the use of the cured product of an epoxy resin having a polysulfide skeleton in its molecule for the potting material enables a potting material to be obtained that has low compatibility with chemicals and is resistant to the occurrence of swelling caused by the chemicals. In addition, the use of the cured product of an epoxy resin having at least three glycidyl groups in its molecule or the use of the cured product of an epoxy resin and a curing agent at least containing an aromatic polyamine results in a potting material having an increased crosslinking density and even better chemical resistance. Moreover, the use of a potting material and housing material having low contents of metals in their materials enables the obtaining of a chemical free of metal contamination.

In addition, the use of a hollow fiber membrane having a composite structure in which a homogeneous thin film is juxtapositioned between porous support layers, and which has superior chemical resistance and gas permeability, enables the obtaining of a deaeration module having superior chemical resistance, deaeration performance and durability performance.

In addition, the chemical deaeration method using the hollow fiber membrane module of the present invention is a method in which deaeration is performed using a chemical that contains a nonionic fluorosurfactant, and using a hollow fiber membrane in which at least the portions that come in contact with this chemical are composed of polyolefin. Consequently, changes in chemical composition during deaeration treatment are inhibited and a deaerated chemical free of contamination can be obtained efficiently and with stability over a long period of time.

What is claimed is:

1. A potting material for a hollow fiber membrane module that adheres and fixes a hollow fiber membrane that is an epoxy resin cured product in which the weight change per unit surface area of a potting material test piece after immersing said test piece in a chemical for 6 months at room temperature is within the range −20 to +20 mg/cm$^2$, and the metal content in the potting material is 50 ppm or less.

2. The potting material for a hollow fiber membrane module according to claim 1 that is an epoxy resin cured product in which the rate of change in the thickness of a potting material test piece after immersing said test piece in a chemical for 6 months at room temperature is within the range of −15 to +15%.

3. The potting material for a hollow fiber membrane module according to claim 1 that is the cured product of an epoxy resin having a polysulfide skeleton in its molecule and a curing agent at least containing an aromatic polyamine.

4. The potting material for a hollow fiber membrane module according to claim 1 that is the cured product of an epoxy resin having at least three glycidyl groups in its molecule and a curing agent at least containing an aromatic polyamine.

5. The potting material for a hollow fiber membrane module according to claim 1 wherein the chemical is at least one type selected from methanol, ethanol, isopropyl alcohol, butanol, methyl ethyl ketone, ethyl cellosolve, ethyl lactate, propylene glycol monomethyl ether, propylene glycol monomethyl ether acetate, semiconductor developing solution, spin-on-glass solution, printer ink, liquid crystal and photoresist thinner.

6. A hollow fiber membrane module in which a hollow fiber membrane is adhered and fixed by the potting material for a hollow fiber membrane module according to claim 1.

7. The hollow fiber membrane module according to claim 6 wherein, the hollow fiber membrane is a hollow fiber membrane having a composite structure in which a homogeneous thin film is juxtapositioned between porous support layers, the transmission rate ratio of the oxygen transmission rate to the nitrogen transmission rate of the hollow fiber membrane is 1.1 or more, and the rate of change in the above transmission rate ratio after immersing in a chemical for 6 months at room temperature is within the range of −15 to +30%.

8. The hollow fiber membrane module according to claim 7 wherein, the weight change ratio of the hollow fiber membrane after immersing in a chemical for 6 months at room temperature is within the range of −30 to +30%.

9. The hollow fiber membrane module according to claim 7 wherein, the nitrogen transmission rate of the hollow fiber membrane is $0.5 \times 10^{-9}$ cm$^3$/cm$^2$·Pa·sec or more, and the oxygen transmission rate is $0.6 \times 10^{-9}$ cm$^3$/cm$^2$·Pa·sec or more.

10. A chemical deaeration method for removing dissolved gas in a chemical comprising the steps of: passing the chemical through the inside of the hollow fiber membrane of the hollow fiber membrane module according to claim 7 while reducing the pressure of the outside of the hollow fiber membrane, or passing the chemical through the outside of the hollow fiber membrane of the hollow fiber membrane module according to claim 7 while reducing the pressure of the inside of the hollow fiber membrane.

11. The chemical deaeration method according to claim 10, wherein the chemical contains a nonionic fluorosurfactant, and at least the portion of the hollow fiber membrane that comes in contact with the chemical is comprised of polyolefin.

12. A chemical deaeration method for removing dissolved gas in a chemical comprising the steps of: passing the chemical through the inside of the hollow fiber membrane of the hollow fiber membrane module according to claim 6 while reducing the pressure of the outside of the hollow fiber membrane, or passing the chemical through the outside of the hollow fiber membrane of the hollow fiber membrane module according to claim 7 while reducing the pressure of the inside of the hollow fiber membrane.

13. A hollow fiber membrane module in which the hollow fiber membrane is housed in a housing material wherein the housing material is a polyolefin in which the weight change per unit surface area of a polyolefin test piece after immersing said test piece in a chemical for 6 months at room temperature is within the range of −20 to +20 mg/cm$^2$, and the total metal content in the polyolefin is 50 ppm or less.

14. The hollow fiber membrane module according to claim 13, wherein the rate of change in the thickness of a test piece of said polyolefin after immersing said test piece in a chemical for 6 months at room temperature is within the range of −15 to +15%.

15. The hollow fiber membrane module according to claim 13 wherein, said polyolefin is polyethylene.

16. The hollow fiber membrane module according to claim 13 wherein, said polyolefin is a cycloolefin polymer.

17. The hollow fiber membrane module according to claim 13, wherein a hollow fiber membrane is adhered and fixed by a potting material for a hollow fiber membrane module, said potting material is an epoxy resin cured product in which the weight change per unit surface area of a potting material test piece after immersing said test piece in a chemical for 6 months at room temperature is within the range of −20 to +20 mg/cm$^2$, and the metal content in the potting material is 50 ppm or less.

18. The hollow fiber membrane module according to claim 13 wherein, the chemical is at least one type selected from methanol, ethanol, isopropyl alcohol, butanol, methyl ethyl ketone, ethyl cellosolve, ethyl lactate, propylene glycol monomethyl ether, propylene glycol monomethyl ether acetate, semiconductor developing solution, spin-on-glass solution, printer ink, liquid crystal and photoresist thinner.

19. The hollow fiber membrane module according to claim 13 wherein, the hollow fiber membrane is a hollow fiber membrane having a composite structure in which a homogeneous thin film is juxtaposited between porous support layers, the transmission rate ratio of the oxygen transmission rate to the nitrogen transmission rate of the hollow fiber membrane is 1.1 or more, and the rate of change in the above transmission rate ratio after immersing in a chemical for 6 months at room temperature is within the range of −15 to +30%.

20. The hollow fiber membrane module according to claim 19 wherein, the weight change ratio of the hollow fiber membrane after immersing in a chemical for 6 months at room temperature is within the range of −30 to +30%.

21. The hollow fiber membrane module according to claim 19 wherein, the nitrogen transmission rate of the hollow fiber membrane is $0.5 \times 10^{-9}$ cm$^3$/cm$^2$·Pa·sec or more, and the oxygen transmission rate is $0.6 \times 10^{-9}$ cm$^3$/cm$^2$·Pa·sec or more.

22. A chemical deaeration method for removing dissolved gas in a chemical comprising the steps of: passing the chemical through the inside of the hollow fiber membrane of the hollow fiber membrane module according to claim 19 while reducing the pressure of the outside of the hollow fiber membrane, or passing the chemical through the outside of the hollow fiber membrane of the hollow fiber membrane module according to claim 15 while reducing the pressure of the inside of the hollow fiber membrane.

23. The chemical deaeration method according to claim 22, wherein the chemical contains a nonionic fluorosurfactant, and at least the portion of the hollow fiber membrane that comes in contact with the chemical is comprised of polyolefin.

24. A chemical deaeration method for removing dissolved gas in a chemical comprising the steps of: passing the chemical through the inside of the hollow fiber membrane of the hollow fiber membrane module according to claim 13 while reducing the pressure of the outside of the hollow fiber membrane, or passing the chemical through the outside of the hollow fiber membrane of the hollow fiber membrane module according to claim 8 while reducing the pressure of the inside of the hollow fiber membrane.

* * * * *